United States Patent
Sabe et al.

(10) Patent No.: US 7,386,163 B2
(45) Date of Patent: Jun. 10, 2008

(54) OBSTACLE RECOGNITION APPARATUS AND METHOD, OBSTACLE RECOGNITION PROGRAM, AND MOBILE ROBOT APPARATUS

(75) Inventors: Kohtaro Sabe, Tokyo (JP); Kenta Kawamoto, Tokyo (JP); Takeshi Ohashi, Kanagawa (JP); Masaki Fukuchi, Tokyo (JP); Atsushi Okubo, Tokyo (JP); Steffen Gutmann, Tokyo (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 10/387,647

(22) Filed: Mar. 13, 2003

(65) Prior Publication Data

US 2004/0013295 A1 Jan. 22, 2004

(51) Int. Cl.
- G06K 9/00 (2006.01)
- H04N 15/00 (2006.01)
- H04N 7/00 (2006.01)
- H04N 7/18 (2006.01)
- G06F 19/00 (2006.01)
- G06F 17/10 (2006.01)
- G01C 22/00 (2006.01)

(52) U.S. Cl. ............... 382/153; 382/104; 382/106; 382/154; 348/42; 348/118; 348/135; 700/245; 701/28; 701/300

(58) Field of Classification Search ........ 382/103–108, 382/153–154; 348/42–51, 113–124, 135–137, 348/139–143, 152–155; 700/245, 251, 258–259; 701/23, 28, 300–301
See application file for complete search history.

(56) References Cited

U.S. PATENT DOCUMENTS 4,412,121 A * 10/1983 Kremers et al. ............ 348/136

(Continued)

FOREIGN PATENT DOCUMENTS

JP 10 96607 4/1998

(Continued)

OTHER PUBLICATIONS

Murray, Don and Jim Little. "Using Real-Time Stereo Vision for Mobile Robot Navigation". Kluwer Academic Publishers. Hingham, MA. Autonomous Robots (Apr. 2000). vol. 8. Issue 2. pp. 161-171.*

(Continued)

Primary Examiner—Bravesh M. Mehta
Assistant Examiner—Manav Seth
(74) Attorney, Agent, or Firm—Frommer Lawrence & Haug LLP; William S. Frommer; Thomas F. Presson

(57) ABSTRACT

An obstacle recognition apparatus is provided which can recognize an obstacle by accurately extracting a floor surface. It includes a distance image generator (222) to produce a distance image using a disparity image and homogeneous transform matrix, a plane detector (223) to detect plane parameters on the basis of the distance image from the distance image generator (222), a coordinate transformer (224) to transform the homogeneous transform matrix into a coordinate of a ground-contact plane of a robot apparatus (1), and a floor surface detector (225) to detect a floor surface using the plane parameters from the plane detector (223) and result of coordinate transformation from the coordinate transformer (224) and supply the plane parameters to an obstacle recognition block (226). The obstacle recognition block (226) selects one of points on the floor surface using the plane parameters of the floor surface detected by the floor surface detector (225) and recognizes an obstacle on the basis of the selected point.

6 Claims, 32 Drawing Sheets

U.S. PATENT DOCUMENTS

| | | | | |
|---|---|---|---|---|
| 4,647,965 A | * | 3/1987 | Imsand | 348/47 |
| 4,965,499 A | * | 10/1990 | Taft et al. | 700/259 |
| 5,200,818 A | * | 4/1993 | Neta et al. | 348/39 |
| 5,416,713 A | * | 5/1995 | Kameda et al. | 701/301 |
| 5,444,478 A | * | 8/1995 | Lelong et al. | 348/39 |
| 5,592,215 A | * | 1/1997 | Kuga | 348/51 |
| 5,633,995 A | * | 5/1997 | McClain | 345/419 |
| 5,959,663 A | * | 9/1999 | Oba et al. | 348/46 |
| 6,272,237 B1 | * | 8/2001 | Hashima | 382/153 |
| 6,377,013 B2 | * | 4/2002 | Suzuki | 318/568.1 |
| 6,400,313 B1 | * | 6/2002 | Morici et al. | 342/176 |
| 6,456,731 B1 | * | 9/2002 | Chiba et al. | 382/107 |
| 6,542,249 B1 | * | 4/2003 | Kofman et al. | 356/601 |
| 6,788,809 B1 | * | 9/2004 | Grzeszczuk et al. | 382/154 |
| 6,826,293 B2 | * | 11/2004 | Matsunaga | 382/106 |
| 6,919,909 B1 | * | 7/2005 | Spletzer et al. | 345/632 |
| 6,945,341 B2 | * | 9/2005 | Ogawa et al. | 180/8.1 |
| 2001/0021882 A1 | * | 9/2001 | Hosonuma et al. | 700/245 |
| 2005/0131581 A1 | * | 6/2005 | Sabe et al. | 700/245 |

FOREIGN PATENT DOCUMENTS

JP    2002 65721    3/2002

OTHER PUBLICATIONS

Demirdjian, D. and T. Darrell. "Motion Estimation from Disparity Images". In Proc. International Conference on Computer Vision (Jul. 2001). vol. 1. pp. 213-218.*

Desrochers, A. and A. Riviere. "A Matrix Approach to the Representation of Tolerance Zones and Clearances". The International Journal of Advanced Manufacturing Technology (1997) 13:630-636.*

Yanagida, Yasuyuki and Susumu Tachi. "Coherency of Kinesthetic and Visual Sensation in Virtual Reality Systems". Proceedings of the 1994 IEEE International Conference on Multisensor Fusion and Integration for Intelligent Systems (MF1'94), Las Vegas, NV, Oct. 2-5, 1994. pp. 455-462.*

Shimada, Daisuke, Hideki Tanahashi, Kunihito Kato, and Kazuhiko Yamamoto. Third International Conference on 3-D Digital Imaging and Modeling, 2001. pp. 42-47.*

* cited by examiner 201L            201R

312

Dth=10mm

| | INPUT EVENT NAME | DATA NAME | DATA RANGE | PROBABILITY OF TRANSITION TO OTHER NODE | | | | | n |
|---|---|---|---|---|---|---|---|---|---|
| | | | | A | B | C | D | | |
| node 100 | | | | node 120 | node 120 | node 1000 | | | node 600 |
| TRANSIT TO | | | | ACTION 1 | ACTION 2 | MOVE BACK | | | ACTION 4 |
| OUTPUT BEHAVIOR | | | | 30% | 40% | | | | |
| 1 | BALL | SIZE | 0,1000 | | | | | | |
| 2 | PAT | | | | | | | | |
| 3 | HIT | | | | | 50% | | | |
| 4 | MOTION | | | | | | | | |
| 5 | OBSTACLE | DISTANCE | 0,100 | | | 100% | | | |
| 6 | | JOY | 50,100 | | | | | | |
| 7 | | SURPRISE | 50,100 | | | | | | |
| 8 | | SADNESS | 50,100 | | | | | | |

OBSTACLE RECOGNITION APPARATUS AND METHOD, OBSTACLE RECOGNITION PROGRAM, AND MOBILE ROBOT APPARATUS

BACKGROUND OF THE INVENTION

1. Field of the Invention

The present invention generally relates to an obstacle recognition apparatus and method, and more particularly to an obstacle recognition apparatus, obstacle recognition method and an obstacle recognition program, applied in a mobile robot apparatus to recognize an obstacle on a floor, and a mobile robot apparatus.

This application claims the priority of the Japanese Patent Application No. 2002-073388 filed on Mar. 15, 2002, the entirety of which is incorporated by reference herein.

2. Description of the Related Art

Needless to say, it is important for the autonomous robot to be able to recognize its surroundings for programming a route it should take and move along the route. The conventional mobile or locomotive robots include a wheeled type robot, walking type robot (bipedal and quadrupedal), etc. The wheeled type robot provided around it ultrasonic sensors disposed in parallel to the floor surface to detect reflected ultrasound from a wall or the like. Since the ultrasonic sensors are disposed in parallel to the floor surface, they will not detect such return ultrasound from the floor surface and can thus recognize all points having reflected the ultrasound as obstacles. Therefore, it is easy to process the ultrasound information for recognition of such obstacles. Since this method permits to detect only an obstacle having a predetermined height, however, the robot cannot recognize any obstacle such as a small step (lower than the predetermined height) or a hole or concavity in the floor. On the other hand, the walking robot, quadrupedal or bipedal, has such a distance sensor installed on a part thereof that can actively be changed in posture, such as the head, hand end, etc.

The quadrupedal walking robot (entertainment robot) having recently been well known employs a distance sensor installed on the head thereof to derive floor parameter from a posture of the robot and judge, on the basis of the floor surface parameter, whether a ranged point is a floor surface or an obstacle.

However, the method adopted in the quadrupedal walking robot can range only one point (or several points when the distance detection is repeatedly tried with the robot posture being changed) and so can hardly detect the surroundings of the robot satisfactorily. Also, this method can detect one point at each time of distance detection, it is not so highly reliable in terms of the accuracy of distance detection.

OBJECT AND SUMMARY OF THE INVENTION

It is therefore an object of the present invention to overcome the above-mentioned drawbacks of the related art by providing an obstacle recognition apparatus, obstacle recognition method and an obstacle recognition program, capable of accurately extracting a floor surface to recognize an obstacle on the floor.

The present invention has another object to provide a mobile robot apparatus capable of moving while recognizing an obstacle of a floor by the use of the obstacle recognition apparatus.

The above object can be attained by providing an obstacle recognition apparatus including, according to the present invention, a distance image producing means for producing a distance image on the basis of a disparity image calculated based on image data supplied from a plurality of imaging means provided in a robot apparatus and sensor data outputs from a plurality of sensing means provided in the robot apparatus and using a homogeneous transform matrix corresponding to the disparity image at locations of the plurality of imaging means, a plane detecting means for detecting a parameter on the basis of the distance image produced by the distance image producing means, a coordinate transforming means for transforming a coordinate system at the locations of the plurality of imaging means into a one on the floor surface, a floor surface detecting means for detecting the floor surface on the basis of the parameter detected by the plane detecting means, and an obstacle recognizing means for selecting a point on the floor surface using the parameter supplied from the plane detecting means to recognize an obstacle on the basis of the selected point.

Also, the above object can be attained by providing an obstacle recognition means including, according to the present invention, steps of producing a distance image on the basis of a disparity image calculated based on image data supplied from a plurality of imaging means provided in a robot apparatus and sensor data outputs from a plurality of sensing means provided in the robot apparatus and using a homogeneous transform matrix corresponding to the disparity image at locations of the plurality of distance image producing means, detecting a parameter on the basis of the distance image produced in the distance image producing step, transforming a coordinate system at the locations of the plurality of imaging means into a one on the floor surface, a floor surface detecting means for detecting the floor surface on the basis of the parameter detected in the plane detecting step, and an obstacle recognizing means for selecting a point on the floor surface using the parameter supplied from the detecting step to recognize an obstacle on the basis of the selected point.

Also, the above object can be attained by providing an obstacle recognition program executed by a robot apparatus to recognize an obstacle, the program including, according to the present invention, steps of producing a distance image on the basis of a disparity image calculated based on image data supplied from a plurality of imaging means provided in the robot apparatus and sensor data outputs from a plurality of sensing means provided in the robot apparatus and using a homogeneous transform matrix corresponding to the disparity image at locations of the plurality of distance image producing means, detecting a parameter on the basis of the distance image produced in the distance image producing step, transforming a coordinate system at the locations of the plurality of imaging means into a one on the floor surface, a floor surface detecting means for detecting the floor surface on the basis of the parameter detected in the plane detecting step, and an obstacle recognizing means for selecting a point on the floor surface using the parameter supplied from the detecting step to recognize an obstacle on the basis of the selected point.

Also, the above object can be attained by providing a mobile robot apparatus composed of a head unit having a plurality of imaging means and sensing mans, at least one moving leg unit having a sensing means, and a body unit having an information processing means and sensing, and that moves on a floor surface by the use of the moving leg unit while recognizing an obstacle on the floor surface, the apparatus including in the body unit thereof, according to the present invention, a distance image producing means for producing a distance image on the basis of a disparity image calculated based on image data supplied from the plurality of imaging means provided in the head unit and sensor data outputs from the plurality of sensing means provided in the head, moving leg and body units, respectively, and using a homogeneous transform matrix corresponding to the disparity image at locations of the plurality of imaging means, a plane detecting means for detecting a parameter on the basis of the distance image produced by the distance image producing means, a coordinate transforming means for transforming a coordinate system at the locations of the plurality of imaging means into a one on the floor surface, a floor surface detecting means for detecting the floor surface on the basis of the plane parameters detected by the plane detecting means, and an obstacle recognizing means for selecting a point on the floor surface using the plane parameters supplied from the plane detecting means to recognize an obstacle on the basis of the selected point.

According to the present invention, a two-dimensional distance sensor such as a stereoscopic camera or the like is used as each of the plurality of imaging means. With the distance sensors, it is possible to extract a floor surface more robustly and accurately from a relation between the plane detection by the image recognition and robot posture.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 13(a) to 13(d) show how an environmental map is updated in an position recognition apparatus correspondingly to a travel of the robot apparatus, in which FIGS. 13(a) and FIG. 13(b) show one of the environmental maps being not to be updated and FIGS. 13(c) and 13(d) show the other environmental map being to be updated;

FIG. 32 shows a state transition table prepared at each node of the finite probability automaton.

DETAILED DESCRIPTION OF THE PREFERRED EMBODIMENTS

An embodiment of the present invention will be described herebelow with reference to the accompanying drawings. The embodiment is an application of the obstacle recognition apparatus according to the present invention to a bipedal walking robot apparatus.

Figure 1:
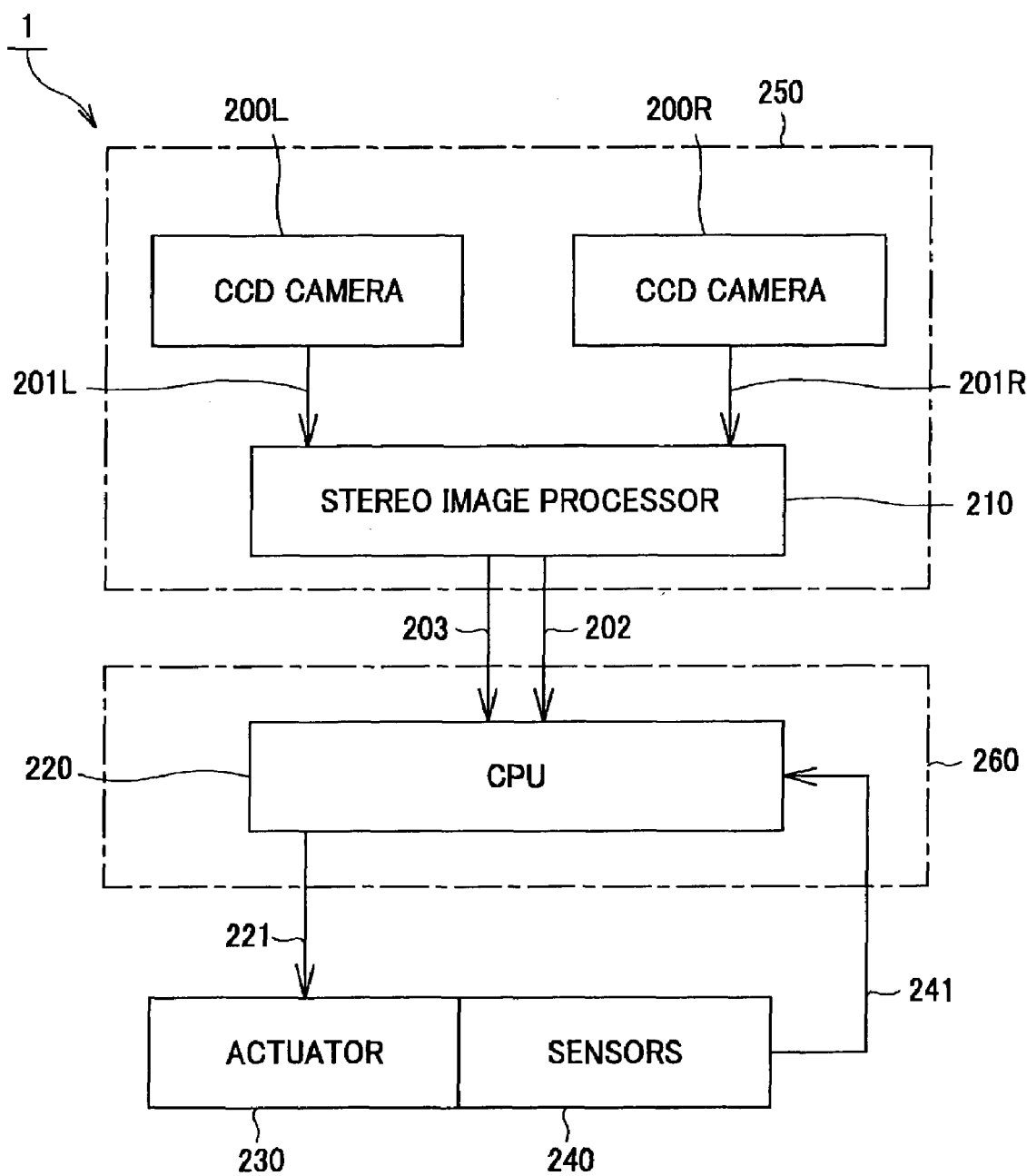
FIG. 1 is a schematic block diagram of an embodiment of the robot apparatus according to the present invention.

Referring now to FIG. 1, there is schematically illustrated in the form of a block diagram of the bipedal walking robot apparatus. As shown in FIG. 1, the robot apparatus is generally indicated with a reference 1, and includes a head unit 250. The head unit 250 has two CCD cameras 200R and 200L provided herein and a stereo image processor 210 provided behind the CCD cameras 200R and 200L. The two CCD cameras (will be referred to as "right CCD camera 200R" and "left CCD camera 200L", respectively, hereunder) provide a right image 201R and left image 201L, respectively. These images 201R and 201L are supplied to the stereo image processor 210. The stereo image processor 210 calculates disparity information (distance information) on the right and left images 201R and 201L and also calculates a color image (YUV: Y=brightness and UV=color difference) 202 and disparity image (YDR: Y=brightness, D=disparity and R=reliability) 203 alternately for each of right and left frames. It should be noted that the "disparity" is a difference between right and left mapped points in the space and it varies correspondingly to the distance from the CCD cameras.

The color image 202 and disparity image 203 are supplied to a CPU (controller) 220 incorporated in a body unit 260 also included in the robot apparatus 1. Also, each of joints of the robot apparatus 1 is provided with an actuator 230. The actuator 230 is supplied with a control signal 231 as a command from the CPU 220 to drive a motor according to the command. Each joint (actuator) has installed thereto a potentiometer which supplies a present angle of rotation of the motor to the CPU 220. The potentiometer installed on the actuator 230 and sensors 240 including a touch sensor installed to the foot sole and giro sensor installed to the body unit 260 measure the present state of the robot apparatus 1 such as a present angle of joint, installation information, posture information, etc. and supply them as sensor data 241 to the CPU 220. The CPU 220 is thus supplied with the color image 202 and disparity image 203 from the stereo image processor 210 and sensor data 241 such as the angles of joints from all the actuators 230, and implements a software configuration as will be described later.

The software used in this embodiment is configured for each of objects to perform various recognition processes to recognize a position and travel (moving distance) of the robot apparatus 1, an obstacle to the robot apparatus 1, and an environmental map, etc. of the robot apparatus 1 and output a list of behaviors any of which the robot apparatus 1 finally selects. The embodiment uses, as a coordinate indicative of a position of the robot apparatus 1, two coordinate systems: one is a camera coordinate system belonging to the worldwide reference system in which a specific object such as a landmark which will be described later is taken as the coordinate origin (will be referred to as "absolute coordinate" hereunder wherever appropriate), and the other is a robot-centered coordinate system in which the robot apparatus 1 itself is taken as the coordinate origin (will be referred to as "relative coordinate" hereunder wherever appropriate).

Figure 2:
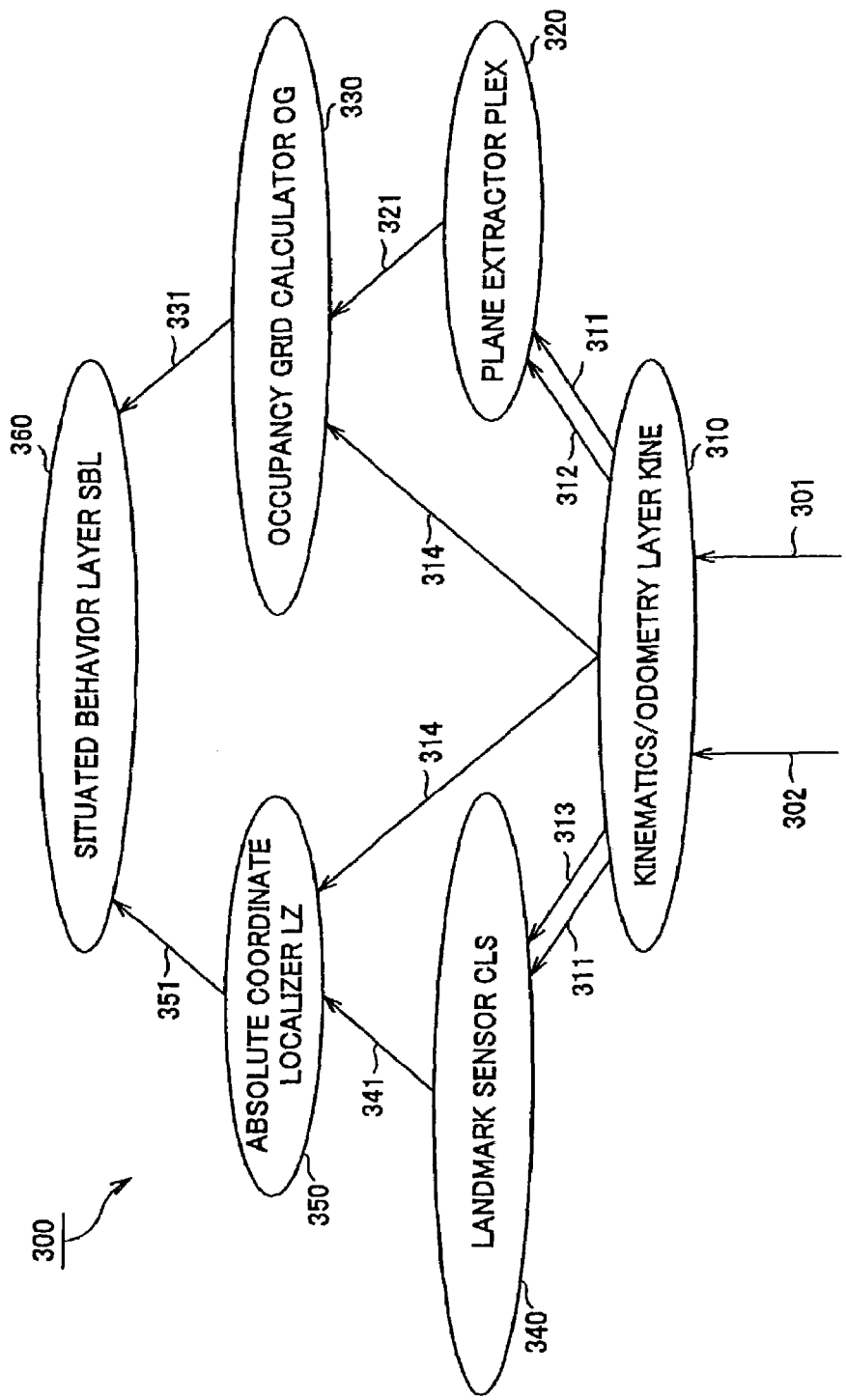
FIG. 2 schematically shows the construction of the software used in the embodiment of the robot apparatus according to the present invention.

FIG. 2 is a schematic diagram showing the construction of the software used in the bipedal walking robot apparatus according to the present invention. In FIG. 2, encircled blocks are entities called "object" or "process". Asynchronous communications between the objects enable the entire system of the robot apparatus 1 to work. Each of the objects transfers and invokes data via a message communication and an inter-object communication using a common memory.

The above software is generally indicated with a reference 300. As shown in FIG. 2, the software 300 is composed of objects including a kinematics/odometry layer KINE 310, plane extractor PLEX 320, occupancy grid calculator OG 330, landmark sensor CLS 340, absolute coordinate localizer LZ 350 and a situated behavior layer SBL 360, each of which operate independently. These objects of the software are constructed and function as will be described in detail later. Also, the construction and actions of the robot apparatus 1 will be described in detail later.

Figure 3:
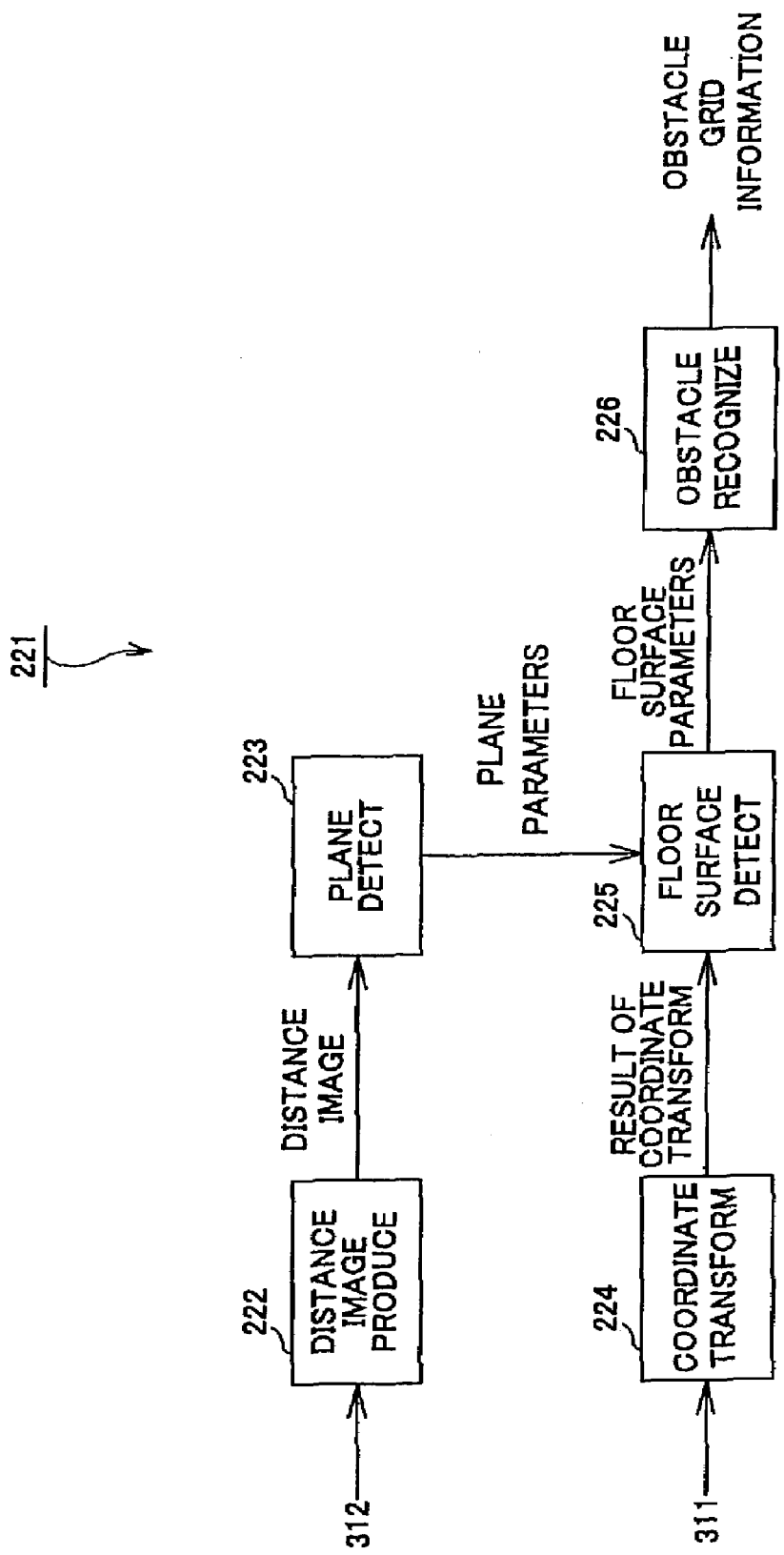
FIG. 3 is a functional block diagram of the obstacle recognition apparatus according to the present invention.

First, the obstacle recognition apparatus according to the present invention, installed in the aforementioned robot apparatus 1, will be described. The obstacle recognition apparatus is constructed in the CPU 220 which performs the plane extractor PLEX 320. FIG. 3 is a functional block diagram of the obstacle recognition apparatus. As shown, the obstacle recognition apparatus generally indicated with a reference 221 includes a distance image generator 222 to produce a distance image from a disparity image which will be described later, a plane detector 223 to detect a plane from the distance image and calculate plane parameters, a coordinate transformer 224 to transform a homogeneous transform matrix which will be described later into a coordinate, a floor surface detector 225 to detect a floor surface from the result of coordinate transform and plane parameter, and an obstacle recognition block 226 to recognize an obstacle from the plane parameters of the floor surface.

The above distance image generator 222 produces a distance image on the basis of a disparity image calculated based on image data supplied from the two CCD cameras provided in the robot apparatus 1 and sensor data output from a plurality of sensors provided in the robot apparatus 1 and using a homogeneous transform matrix corresponding to the disparity image at locations of the two CCD cameras. The plane detector 223 detects plane parameters on the basis of the distance image produced by the distance image generator 222. The coordinate transformer 224 transforms the homogeneous transform matrix into a coordinate on a surface with which the robot apparatus 1 is in contact. The floor surface detector 225 detects a floor surface using the plane parameters supplied from the plane detector 223 and result of the coordinate conversion made by the coordinate transformer 224, and supplies the plane parameters to the obstacle recognition block 226. The obstacle recognition block 226 selects a point on the floor surface using the plane parameters of the floor surface detected by the floor surface detector 225 and recognizes an obstacle on the basis of the selected point.

Figure 4:
FIG. 4 explains the production of a disparity image for entry to the plane extractor PLEX.
Figure 4:
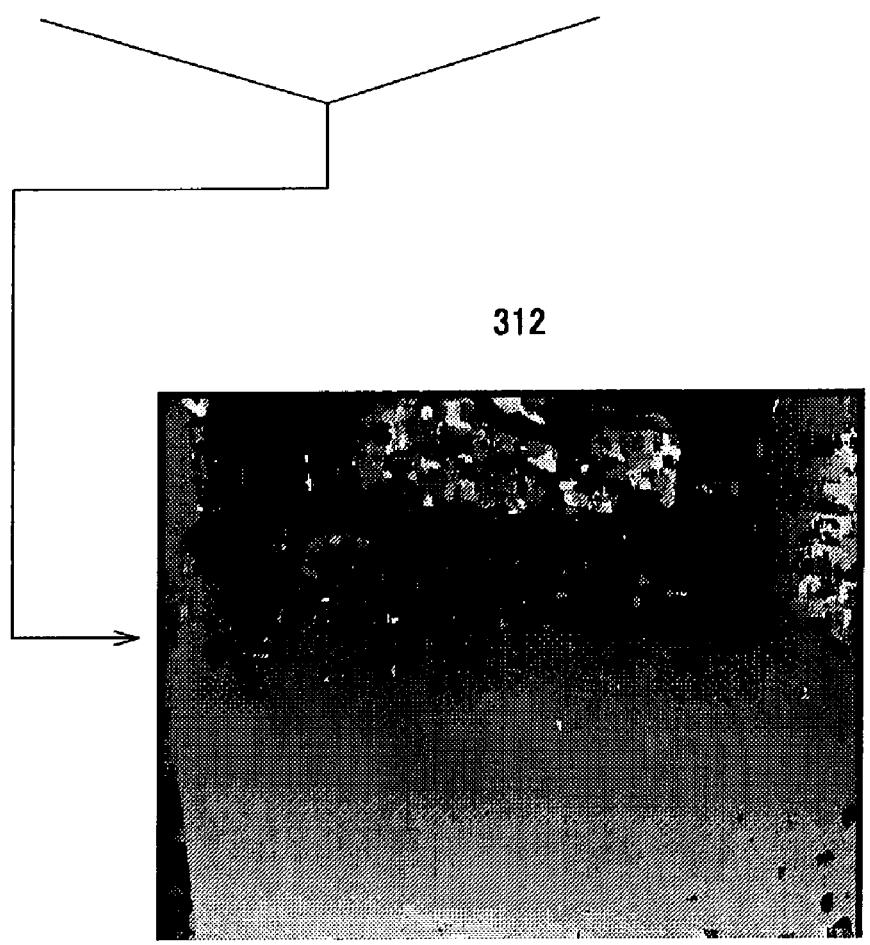

As aforementioned, images captured by the CCD cameras 200L and 200R are supplied to the stereo image processing 210 which will calculate a color image (YUV) 202 and a disparity image (YDR) 203 from disparity information (distance information) in the right and left disparity images 201R and 201L shown in detail in FIG. 4 and supply the data to the CPU 220. The stereo image processor 210 is also supplied with the sensor data 204 from the plurality of sensors provided on the robot apparatus 1. As shown in FIG. 2, image data 301 including these disparity information and image and sensor data 302 that are data on the angles of joints of the robot apparatus 1 are supplied to the kinematics/odometry layer KINE 310.

The kinematics/odometry layer KINE 310 determines the joint angles in the sensor data 302 at the time when the image data 301 was acquired on the basis of the input data including he image data 301 and sensor data 302, and uses the joint angle data to transform the robot-centered coordinate system in which the robot apparatus 1 is fixed in the center into the coordinate system of the CCD cameras installed on the head unit 250. In this case, the embodiment of the obstacle recognition apparatus according to the present invention derives a homogeneous transform matrix 311 etc. of the camera coordinate system from the robot-centered coordinate system and supplies the homogeneous transform matrix 311 and disparity image 312 corresponding to the former to the obstacle recognition apparatus 221 (plane extractor PLEX 320) in FIG. 3.

Figure 5:
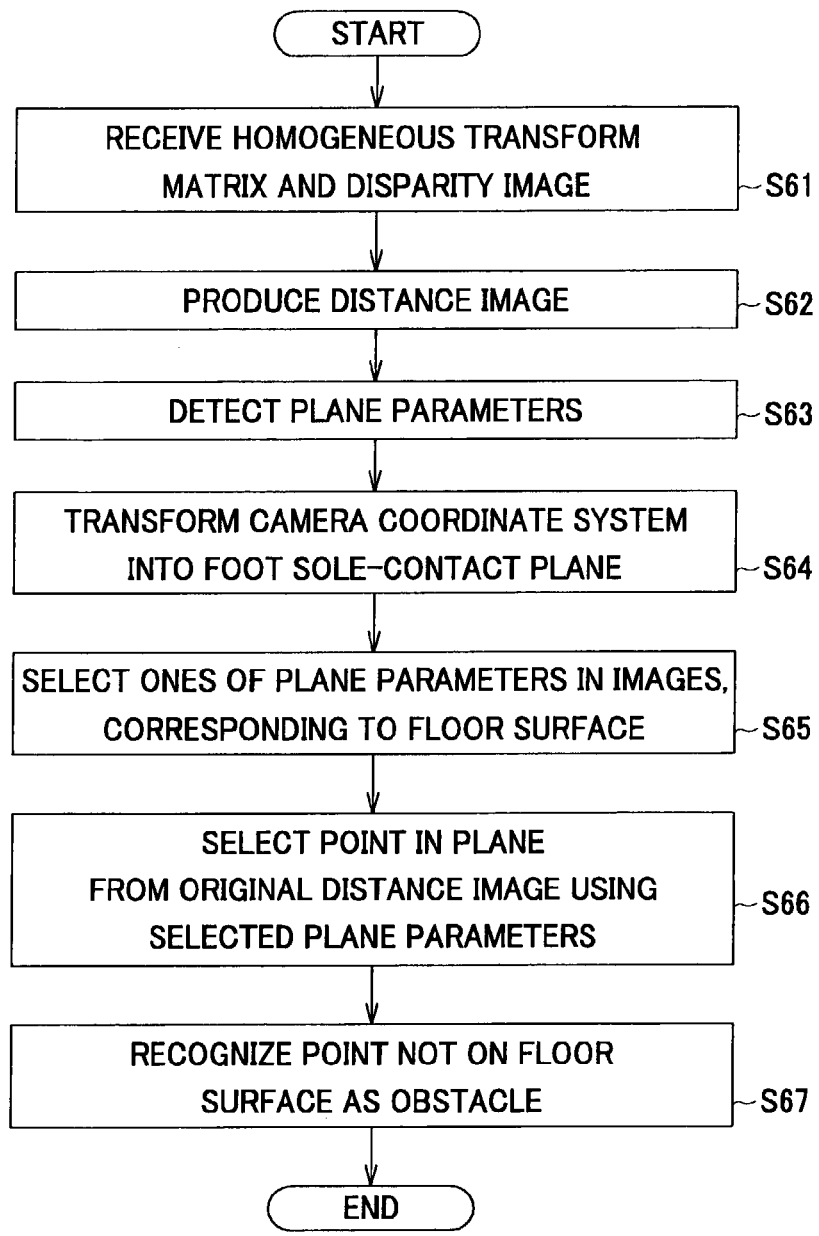
FIG. 5 shows a flow of operations made by the plane extractor PLEX to recognize an obstacle.
Figure 6:
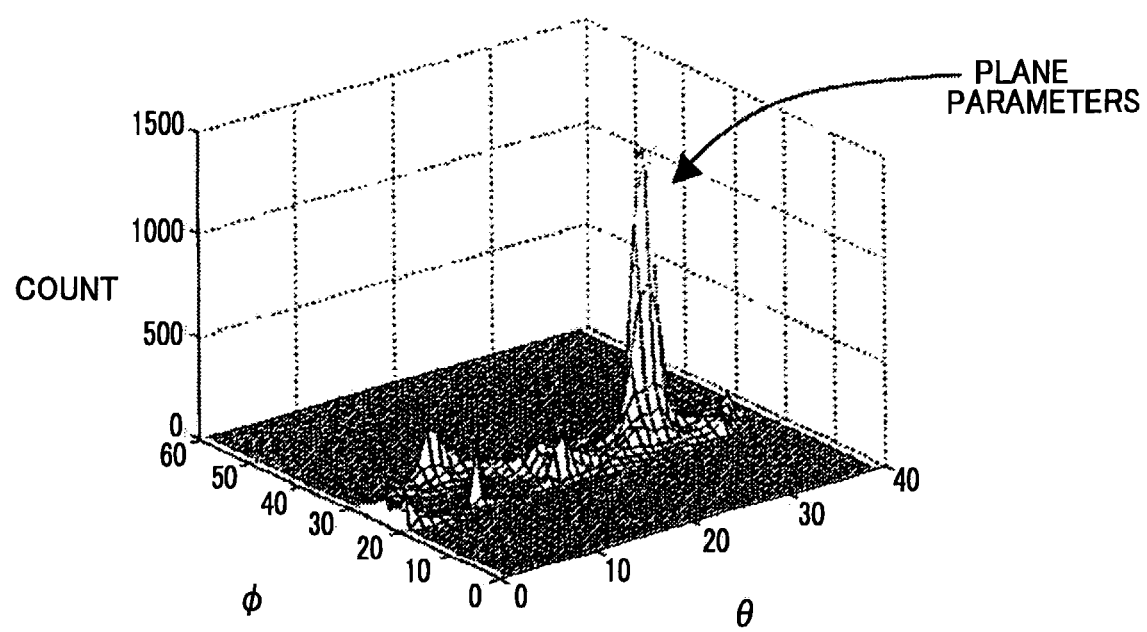
FIG. 6 shows plane parameters detected by the plane extractor PLEX.

The obstacle recognition apparatus 221 (plane extractor PLEX 320) receives the homogeneous transform matrix 311 and disparity image 312 corresponding to the former, and follows a procedure given in FIG. 5 to recognize an obstacle.

First, the coordinate transformer 224 in the obstacle recognition apparatus 221 (plane extractor PLEX 320) receives the homogeneous transform matrix 311, and the distance image generator 222 receives the disparity image 312 corresponding to the homogeneous transform matrix 311 (in step S61). Then, the distance image generator 222 produces a distance image from position data (X, Y Z) being three-dimensional when viewed in the camera coordinate for each pixel with the use of a calibration parameter which assimilates a lens distortion and installation error of the stereo cameras (in step S62) from the disparity image 312. Each of the three-dimensional data includes a reliability parameter obtainable from the reliability on an input image such as a disparity image or distance image, and is selected based on the reliability parameter for entry to the distance image generator 222.

The plane detector 223 samples data from a selected three-dimensional data group at random and estimates a plane through Hough transformation. That is, the plane detector 223 estimates a plane by calculating plane parameters ($\theta$, $\phi$, d) on the assumption that the direction of normal vector is ($\theta$, $\phi$) and the distance from the origin is d and voting the above plane parameters directly to a voting space ($\theta$, $\psi$, d)=(($\theta$, $\phi$ cos $\theta$, d). Thus, the plane detector 223 detects parameters of a prevailing plane in the image (step S63). The plane parameters are detected using a histogram of the parameter space (($\theta$, $\phi$) (voting space) shown in FIG. 5. When the voting to the parameters is small, the parameters can be considered to indicate an obstacle. When the voting is large, they can be considered to indicate something included in the plane.

During the voting, the plane detector 223 varies the weight of one vote depending upon the reliability parameter incidental to the three-dimensional data, plane parameters calculating method or the like to vary the importance of a vote, and also averages the weights of votes distributed in the vicinity of a candidate peak voting to estimate a peak voting obtainable from the vote importance. Thus, the plane detector 223 can estimate a highly reliable data. Also, the plane detector 223 iterates the plane parameters as initial parameters to determine a plane. Thus, the plane detector 223 can determine a more highly reliable plane. Further, the plane detector 223 calculates a reliability on the plane using the reliability parameter incidental to the three-dimensional data from which a finally determined plane has been calculated, residual error in the iteration, etc., and outputs the plane reliability along with the plane data, whereby subsequent operations can be done more easily. As above, the plane extraction is performed by such a method based on the probability theory that parameters of a prevailing one of the planes included in the three-dimensional data are determined through estimation of a probability density function standing on a voting, that is, a histogram. By using the plane parameter, it is possible to know a distance, from the plane, of a measured point whose distance has initially been determined based on the images.

Figure 7:
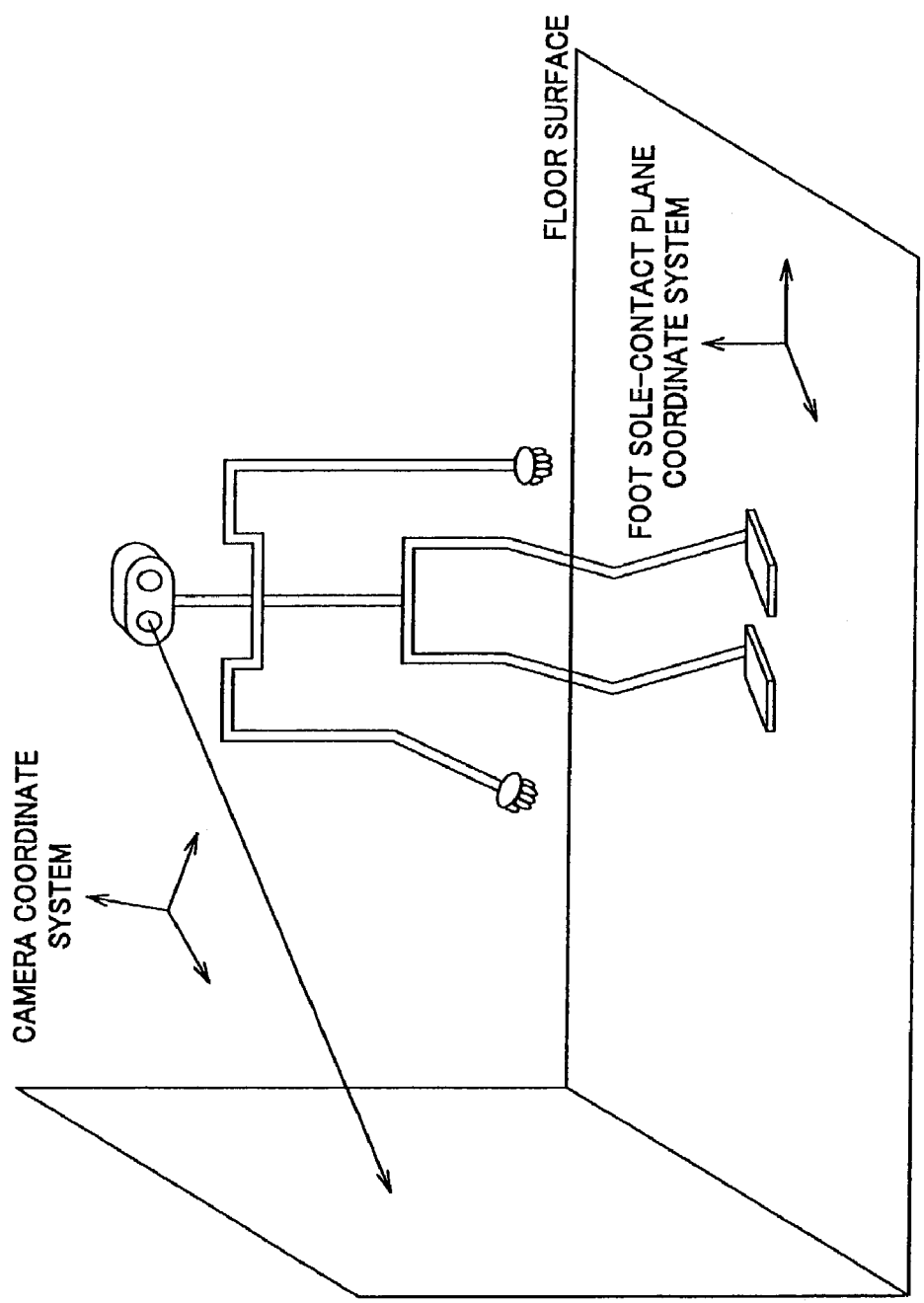
FIG. 7 explains transformation of a camera coordinate into a coordinate system of a plane with which the foot sole is in contact.
Figure 8:
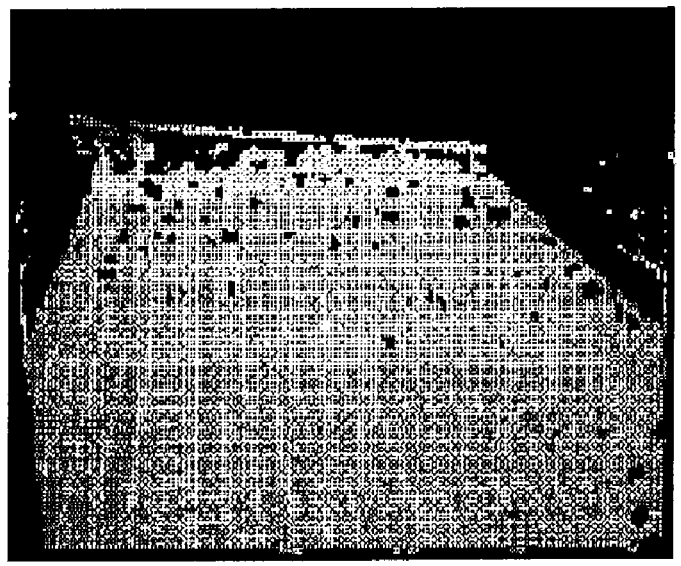
FIG. 8 shows a point in a plane extracted by the plane extractor PLEX.

Next, the coordinate transformer 224 transforms the homogeneous transform matrix 311 of the camera coordinate system into a plane with which the robot's foot sole is in contact, as shown in FIG. 7 (step S64). Thus, parameters of the contact plane represented in the camera coordinate system are calculated. Then, the floor surface detector 225 selects ones of the plane parameters in the images, corresponding to the floor surface, by collating the result of he plane detection by the plane detector 223 from the images in step S63 with the foot sole-contact plane obtained by the coordinate transformer 224 in step S64 (step S65).

Next, the obstacle recognition block 226 selects a point in the plane (on the floor surface) from the original distance image using the plane parameters selected by the floor surface detector 225 in step S65 (step S66). The selection is done based on the formulae (1) and (2) given below and based on the fact that the distance d from the plane is smaller than a threshold $D_{th}$.

$$d = \frac{|ax + by + c|}{\sqrt{a^2 + b^2}} \quad (1)$$

$$d < D_{th} \quad (2)$$

Figure 9:
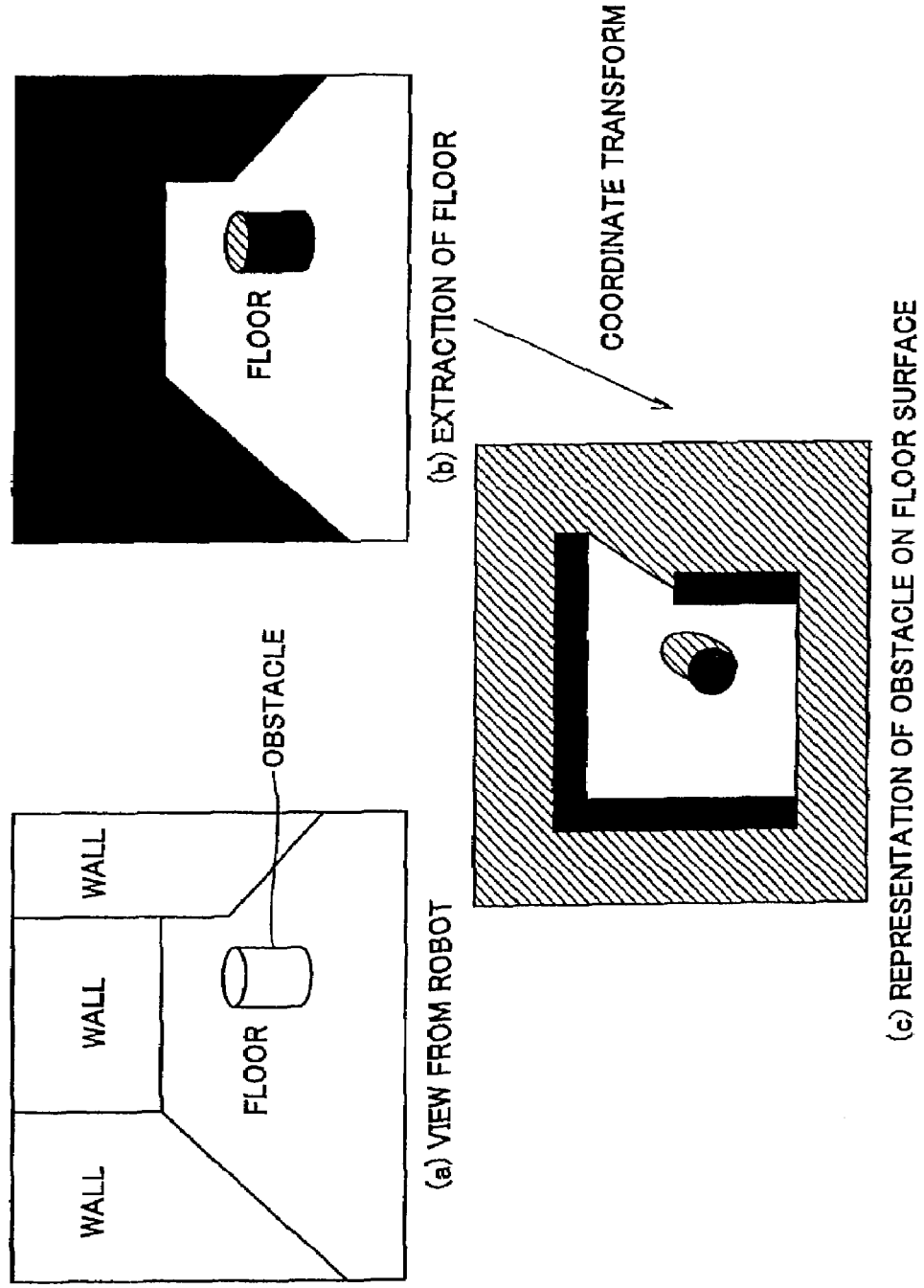
FIG. 9 shows extraction of a floor surface from a robot view and two-dimensional representation of an obstacle on the floor surface through the coordinate transformation.

FIG. 9 shows a measured point (indicated with "x") within a range in which the threshold $D_{th}$ is 1 cm. It should be noted that black portions of the illustration in FIG. 9 are not determined to be any plane.

Therefore, the obstacle recognition block 226 can recognize a point (not on the floor surface) other than the one judged as being in the plane or on the floor surface in step S66 as an obstacle (step S67). The obstacle thus recognized is represented by the point (x, y) on the floor surface and its height z. For example, a height of z<0 indicates a point lower than the floor plane.

Thus, it is possible to determine that an obstacle point higher than the robot is not any obstacle since the robot can go under it.

Also, by transforming the coordinate such that an extracted-floor image (FIG. 9(a)) obtained from a view from the robot (FIG. 9(b)) has a height z of 0 (z=0), it is possible to represent the floor or obstacle in a two-dimensional position on the floor as in FIG. 9(c).

Thus, the obstacle recognition apparatus can extract a stable plane since it detects a plane using many measured points. Also, it can select a correct plane by collating candidate planes obtainable from the image with floor parameters obtainable from a robot's posture. Further, according to the present invention, since the obstacle recognition apparatus substantially recognizes a floor surface, not any obstacle, it can make the recognition independently of the shape and size of an obstacle. Moreover, since an obstacle is represented by its distance from the floor surface, the obstacle recognition apparatus can detect not only an obstacle but a small step or concavity of a floor. Also, the obstacle recognition apparatus can easily judge, with the size of a robot taken in consideration, whether the robot can walk over or under a recognized obstacle. Furthermore, since an obstacle can be represented on a two-dimensional floor surface, the obstacle recognition apparatus can apply the methods used with conventional robots for planning a route and also calculate such routing more speedily than the three-dimensional representation.

Figure 10:
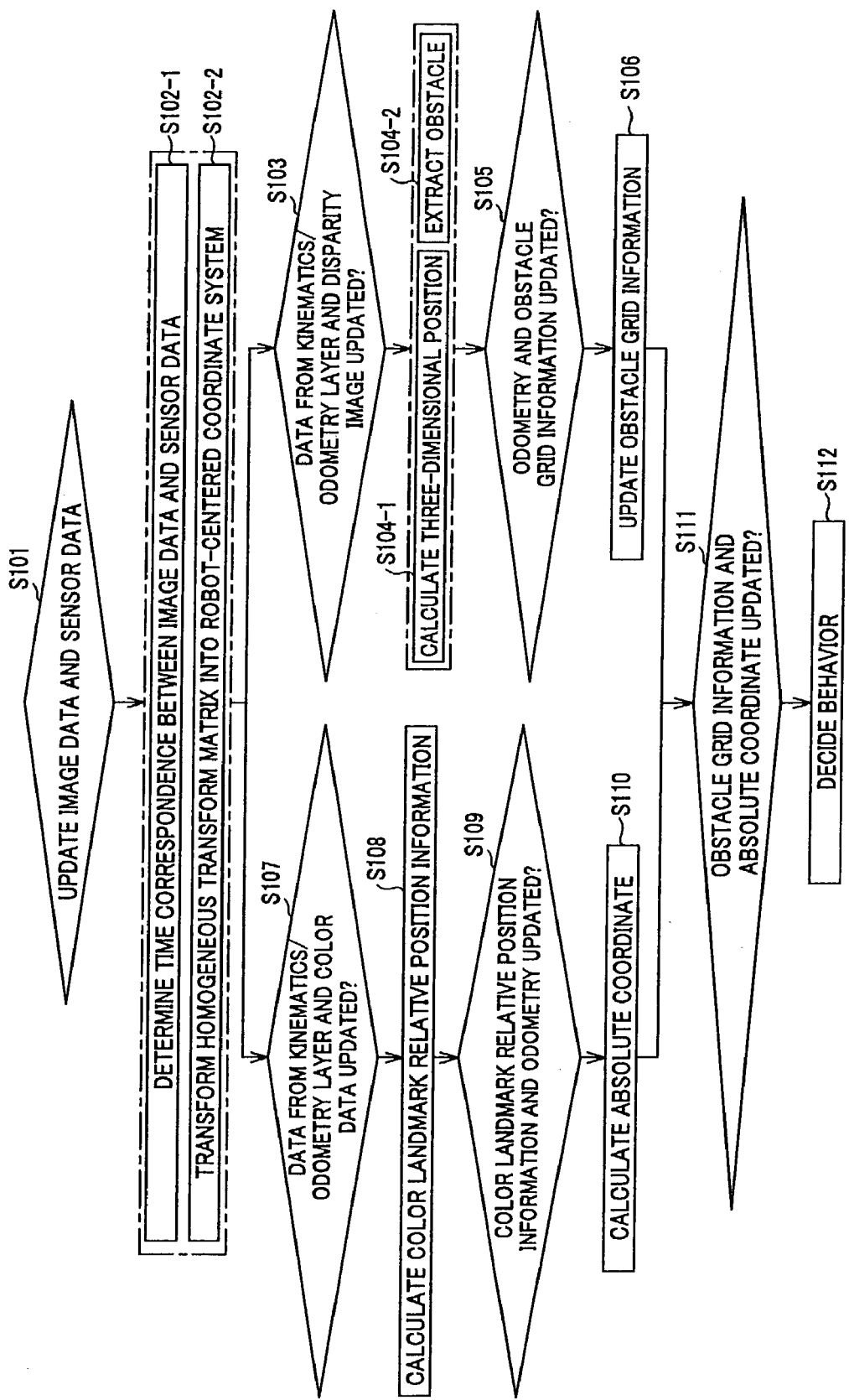
FIG. 10 shows a flow of mobile robot under the software used in the embodiment of the robot apparatus according to the present invention.

Next, the software used in the robot apparatus 1 shown in FIG. 2 will be described in detail below. FIG. 10 shows a flow of operations made under the software 300 shown in FIG. 2.

The kinematics/odometry layer KINE 310 of the software 300 shown in FIG. 2 is supplied with image data 301 and sensor data 302 as having previously been described. The image data 301 is a color image and a disparity image captured by a stereo camera. Also, the sensor data 302 include angles of the joints of the robot apparatus and the like. The kinematics/odometry layer KINE 310 receives these input data 301 and 302 and updates the existent image data and sensor data stored in the memory thereof (step S101).

Next, the kinematics/odometry layer KINE 310 determines a time correspondence between the image data 301 and sensor data 302 (step S102-1). More specifically, there is determined a joint angle in the sensor data 302 at a time when the image data 301 has been captured. Then, the kinematics/odometry layer KINE 310 transforms the robot-centered coordinate system having the robot apparatus 1 positioned in the center thereof into a coordinate system of the camera installed on the head unit (step S102-2) using the joint angle data. In this case, the kinematics/odometry layer KINE 310 derives a homogeneous transform matrix etc. of the camera coordinate system from the robot-centered coordinate system, and sends the homogeneous transform matrix 311 and image data corresponding to the former to an image-recognition object. Namely, the kinematics/odometry layer KINE 310 supplies the homogeneous transform matrix 311 and disparity image 312 to the plane extractor PLEX 320, and the homogeneous transform matrix 311 and color image 313 to the landmark sensor CLS 340.

Also, the kinematics/odometry layer KINE 310 calculates a travel of the robot apparatus 1 from walking parameters obtainable from the sensor data 302 and counts of walks from the foot-sole sensors and then a moving distance of the robot apparatus 1 in the robot-centered coordinate system. In the following explanation, the moving distance of the robot apparatus 1 in the robot-centered coordinate system will also be referred to as "odometry" wherever appropriate. This "odometry" is indicated with a reference 314, and supplied to the occupancy grid calculator OG 330 and absolute coordinate localizer LZ 350.

Supplied with the homogeneous transform matrix 311 calculated by the kinematics/odometry layer KINE 310 and disparity image 312 supplied from a corresponding stereo camera, the plane extractor PLEX 320 updates the existent data stored in the memory thereof (step S103). Then, the plane extractor PLEX 320 calculates three-dimensional position data (range data) from the disparity image 312 with the use of the calibration parameters from the stereo camera etc. (step S104-1). Next, the plane extractor PLEX 320 extracts a plane other than those of walls, table, etc. Also, the plane extractor PLEX 320 determines, based on the homogeneous transform matrix 311, a correspondence between the plane thus extracted and the plane with which the foot sole of the robot apparatus 1 is contact, selects a floor surface, takes a point not on the floor surface, for example, a thing or the like at a position higher than a predetermined threshold, as an obstacle, calculates a distance of the obstacle from the floor surface and supplies information on the obstacle (321) to the occupancy grid calculator (OG) 330 (step S104-2).

Supplied with the odometry 314 calculated by the kinematics/odometry layer KINE 310 and obstacle grid information 321 calculated by the plane extractor PLEX 320, the occupancy grid calculator 330 updates the existent data stored in the memory thereof (step S105). Then, the occupancy grid calculator 330 updates occupancy grid calculators holding a probability that the obstacle is or not on the floor surface by the probability theory-based method (step S106).

The occupancy grid calculator OG 330 holds obstacle grid information on an area extending 4 meters, for example, from around the robot apparatus 1, namely, the aforementioned environmental map, and posture information indicative of an angle in which the robot apparatus 1 is directed.

By updating the environmental map by the above probability theory-based method and supplying the result of updating (obstacle grid information 331) to an upper layer, namely, the situated behavior layer SBL 360 in this embodiment, can plan to have the robot apparatus 1 detour around the obstacle.

Supplied with the homogeneous transform matrix 311 and color image 313 supplied from the kinematics/odometry layer KINE 310, the landmark sensor CLS 340 updates the data pre-stored in the memory thereof (step S107). Then, the landmark sensor CLS 340 processes the color image 313 to detect a pre-recognized color landmark. Using the homogeneous transform matrix 311, it transforms the position and size of the landmark in the color image 313 into ones in the camera coordinate system. Further, the landmark sensor CLS 340 transforms the position of the landmark in the camera coordinate system into a one in the robot-centered coordinate system using the homogeneous transform matrix, and supplies information 341 on the landmark position in the robot-centered coordinate system (landmark relative position information) to the absolute coordinate localizer LZ 350 (step S108).

When the absolute coordinate localizer LZ 350 is supplied with the odometry 314 from the kinematics/odometry layer KINE 310 and color landmark relative position information 341 from the landmark sensor CLS 340, it updates the data pre-stored in the memory thereof (step S109). Then, it calculates an absolute coordinate (a position in the world-wide coordinate system) of the robot apparatus 1 by the probability theory-based method using the color landmark absolute coordinate (a worldwide coordinate system) 351 pre-recognized by the absolute coordinate localizer LZ 350, color landmark relative position information 341 and odometry 314. Then, the absolute coordinate localizer LZ 350 supplies the absolute coordinate position 351 to the situated behavior layer SBL 360.

Supplied with the obstacle grid information 331 from the occupancy grid calculator OG 330 and absolute coordinate position 351 from the absolute coordinate localizer LZ 350, the situated behavior layer SBL 360 updates the data pre-stored in the memory thereof (step S111). Then, the situated behavior layer SBL 360 acquires the result of recognition of an obstacle existing around the robot apparatus 1 from the obstacle grid information 331 supplied from the occupancy grid calculator OG 330 and a present absolute coordinate of the robot apparatus 1 from the absolute coordinate localizer LZ 350, thereby planning a route to a target point given in the absolute coordinate system or robot-centered coordinate system, along which the robot apparatus 1 can reach walking without collision with any obstacle and issuing an action command to behave for walking along the route. That is, the situated behavior layer SBL 360 decides, based on input data, an action the robot apparatus 1 has to do depending upon a situation, and outputs a list of actions (step S112).

For a navigation by the user of the robot apparatus 1, the user is provided with the result of recognition of an obstacle being around the robot apparatus 1 from the occupancy grid calculator OG 330 and the absolute coordinate of the present position of the robot apparatus 1 from the absolute coordinate localizer LZ 350, and an action command is issued in response to an input from the user.

Figure 11:
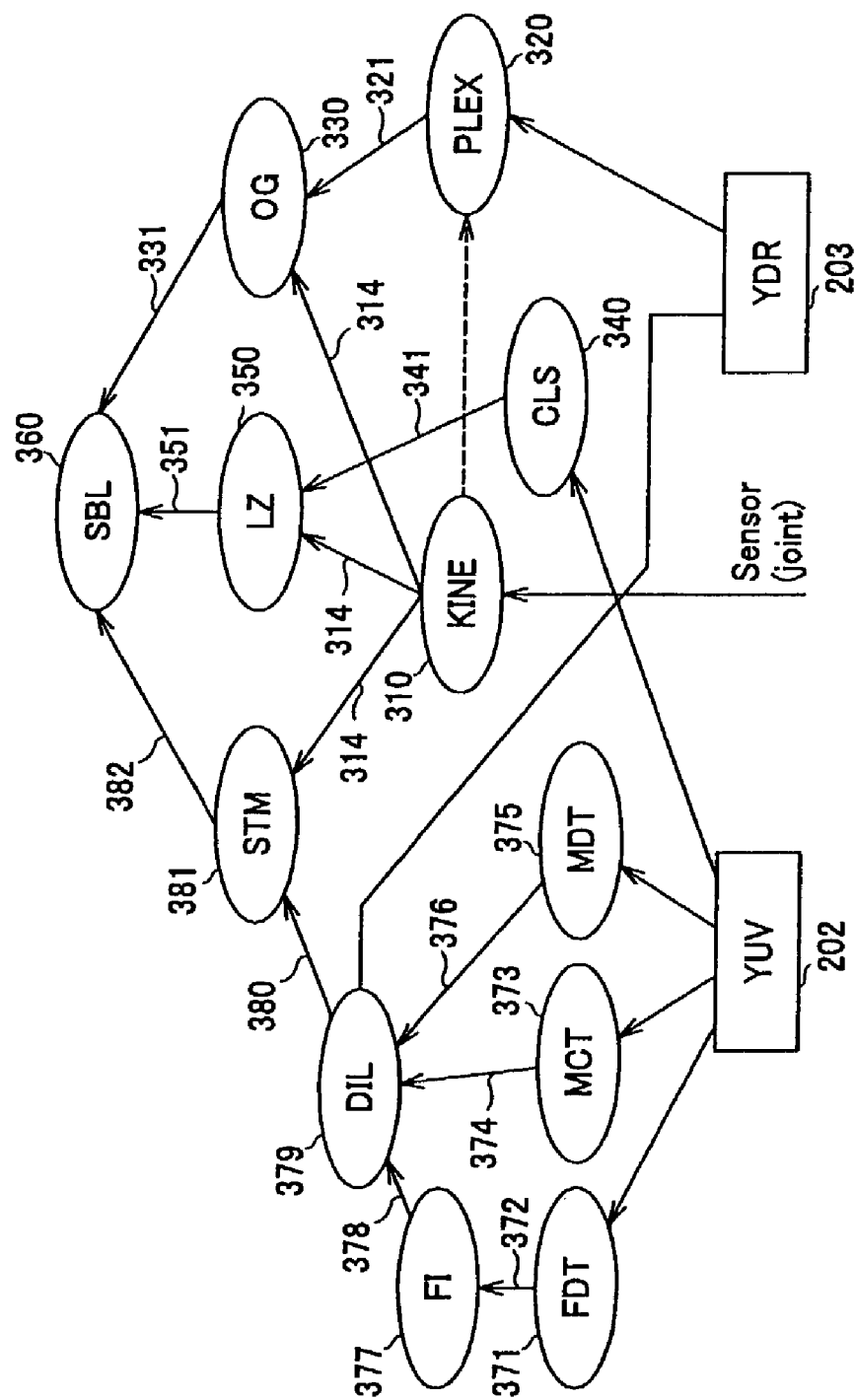
FIG. 11 schematically shows a flow of data for entry to the software.

FIG. 11 schematically shows a flow of data for entry to the aforementioned software. It should be noted that in FIG. 11, the same components as in FIGS. 1 and 2 are indicated with the same references, respectively, and they will not be explained in detail.

As shown in FIG. 11, a face detector FDT 371 is provided as an object to detect a face area from an image frame. It receives the color image 202 from an image input unit such as a camera or the like and reduces it to images in 9 steps of scaling for example. The face detector FDT 371 searches for a rectangular area corresponding to a face from all these scaling images. Then, it provides information 372 including a position, size, feature, etc. of an area finally judged as a face by reducing superposed candidate areas and sends the information 372 to a face identifier FI 377.

The face identifier FI 377 is an object to identify a detected face image. Supplied with the information 372 including rectangular area images indicative of face areas, respectively, from the face detector FDT 371, it judges to which person the face image belong, by comparison through persons' features listed in an on-hand person dictionary stored in the memory thereof. Then, the face identifier FI 377 supplies person ID information 378 along with position and size information of the face image area of an face image received from the face detector FDT 371 to a distance information linker DIL 379.

In FIG. 11, a multicolor tracker MCT 373 is provided as an object to recognize a color. It receives the color image 202 from an image input unit such as a camera, extract a color area on the basis of a plurality of color model information held in advance therein, and divides the color area into successive areas divisions. The multicolor tracker MCT 373 supplies information 374 including the positions, sizes and features of the color area divisions to the distance information linker DIL 379.

Also, a motion detector MDT 375 is provided as an object to detect a moving part of an image. It supplies information 376 on a detected moving area to the distance information linker DIL 379.

The aforementioned distance information linker DIL 379 is an object to add distance information to supplied two-dimensional information to provide three-dimensional information. More specifically, the supplied two-dimensional information includes ID information 378 from the face identifier FI 377, information 374 such as the positions, sizes and features of the color area divisions from the multicolor tracker MCT 373 and information 376 on the moving area from the motion detector MDT 375 to produce three-dimensional information 380, and supplies the data to a short-term memory STM 381.

The short-term memory STM 381 is an object to hold information as to the surroundings of the robot apparatus 1 for a relatively short length of time. It is supplied with the result of sound recognition (words, direction of sound source and certainty factor) from an author decoder (not shown), position and size of a flesh-color area, and position and size of a face area from the multicolor tracker MCT 373, and with person ID information etc. from the face identifier FI 377. Also, the short-term memory STM 381 receives a direction (joint angle) of the neck of the robot apparatus 1 from each of the sensors provided on the robot apparatus 1. Then, using these result of recognition and sensor output coordinately, it stores information on where a person exists at present, what he or she is, which person spoke words and what conversion the first person has had with the second person. The short-time memory STM 381 passes physical information on such a thing or target and events (history) arranged on the time base to a host module such as the situated behavior layer SBL 360.

The situated behavior layer SBL 360 is an object to determine a behavior (situated behavior) of the robot apparatus 1 on the basis of the information supplied from the aforementioned short-term memory STM 381. I can evaluate and perform a plurality of behaviors at the same time. Also, with the robot body set in sleep state by selecting any other behavior, it can start up another behavior.

Next, each of the objects except for the obstacle detection by the plane extractor PLEX 320 having previously been described in detail will described in further detail.

The occupancy grid calculator OG 330 holds an environmental map being map information concerning the robot-centered coordinate system and composed of grids having a predetermined size, and posture information indicative of an angle at which the robot apparatus 1 is directed from a predetermined direction such as x- or y-direction. The environmental map has a grid (obstacle-occupied area) recognized as an obstacle based on the obstacle grid information supplied from the plane extractor PLEX 320. When the robot apparatus 1 moves, namely, when supplied with the odometry 314, the occupancy grid calculator OG 330 updates the pre-recognized environmental map and posture information pre-stored in the memory thereof correspondingly to a change in posture (differential moving angle) and moving distance (differential travel) of the robot apparatus 1. If the differential travel is smaller than the grid size, the occupancy grid calculator OG 330 will not update the environmental map. When the travel exceeds the grid size, the occupancy grid calculator OG 330 updates the environmental map. Also, by changing the environmental map and size of the grids in the map appropriately as necessary, it is possible to reduce the required amount of calculation, memory copy costs, etc.

The occupancy grid calculator OG 330 will be described in further detail below with reference to FIGS. 12 to 17.

Figure 12:
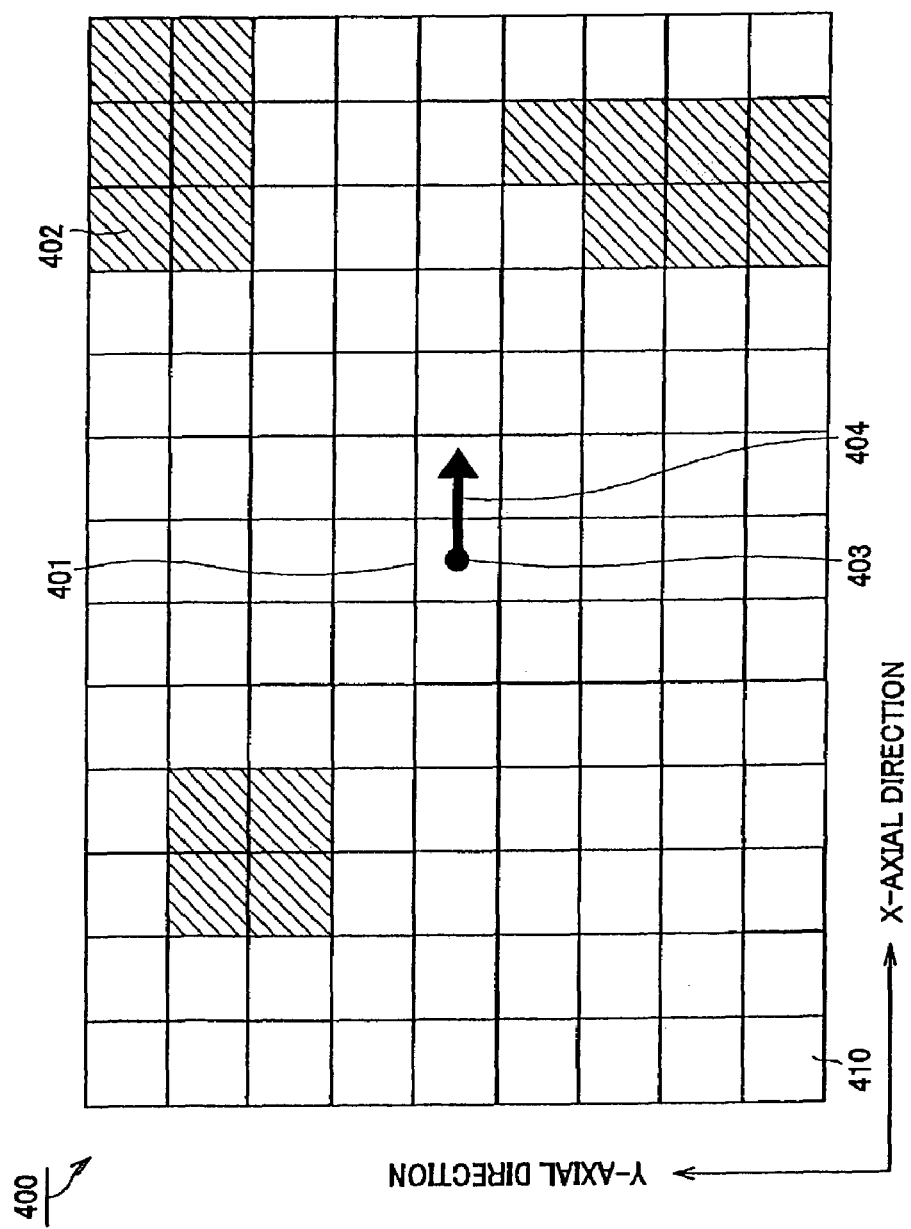
FIG. 12 is a schematic diagram of an environmental map displayed on the obstacle recognition apparatus (in the embodiment of the robot apparatus according to the present invention)

FIG. 12 is a schematic diagram of an environmental map recognized by the occupancy grid calculator OG 330. As shown in FIG. 12, the environmental map generally indicated with a reference 400 is a map of the surroundings of a robot apparatus (moving body) 403 (map information in the robot-centered coordinate system). It is composed of grids 410 having a predetermined size. As the robot apparatus 403 moves, the map 400 is always updated so that the robot apparatus 403 will be positioned in a central grid 401 at the center of the environmental map 400. The environmental map 400 and grids 410 shown in FIG. 12 can be varied in size appropriately as necessary. That is to say, when no detailed environmental map is required, the environmental map 400 can be reduced in scale or the grids 410 be increased in size, to thereby lower the resolution, which will lead to a reduced amount of calculation and less memory copy costs.

As shown in FIG. 12, the grids 402 shown as hatched indicate a minimum unit area (obstacle-occupied area) recognizable as an obstacle. The position recognition apparatus uses a method using a stereo camera or the like to acquire a disparity image, a method using the reflection of a wave as in a range finder or a method using a ranging sensor such as an ultrasonic sensor or the like. The position recognition apparatus recognizes (displays) the position of an obstacle thus recognized as an attribute of the grids in the environmental map. In this embodiment, the obstacle grid information is supplied to the position recognition apparatus from the aforementioned plane extractor PLEX 320.

As mentioned above, when supplied with the odometry 314 from the kinematics/odometry layer KINE 310 which receives data image and sensor data, the occupancy grid calculator OG 330 updates the environmental map pre-stored in the memory thereof. In this memory, there are held the environmental map 400 which is the map information including information on the obstacle existing around the robot apparatus 403 and posture information 404 indicative of the direction of the robot apparatus (moving body) in the map. The posture information indicates an angle in which the robot apparatus 403 is directed from a predetermined direction, for example, x- or y-direction. Then, the occupancy grid calculator OG 330 will update the pre-recognized environmental map and posture direction information shown in FIG. 12 in the following manners correspondingly to a posture change, movement, etc. of the robot apparatus.

First, the method of updating the environmental map will be described. In the position recognition apparatus according to the present invention, the environmental map is not updated depending upon the travel (moving distance) of the robot apparatus. More particularly, if the travel is within a predetermined area (grid), the environmental map is not updated. When the travel exceeds the grid size, the environmental map will be updated.

Figure 13:
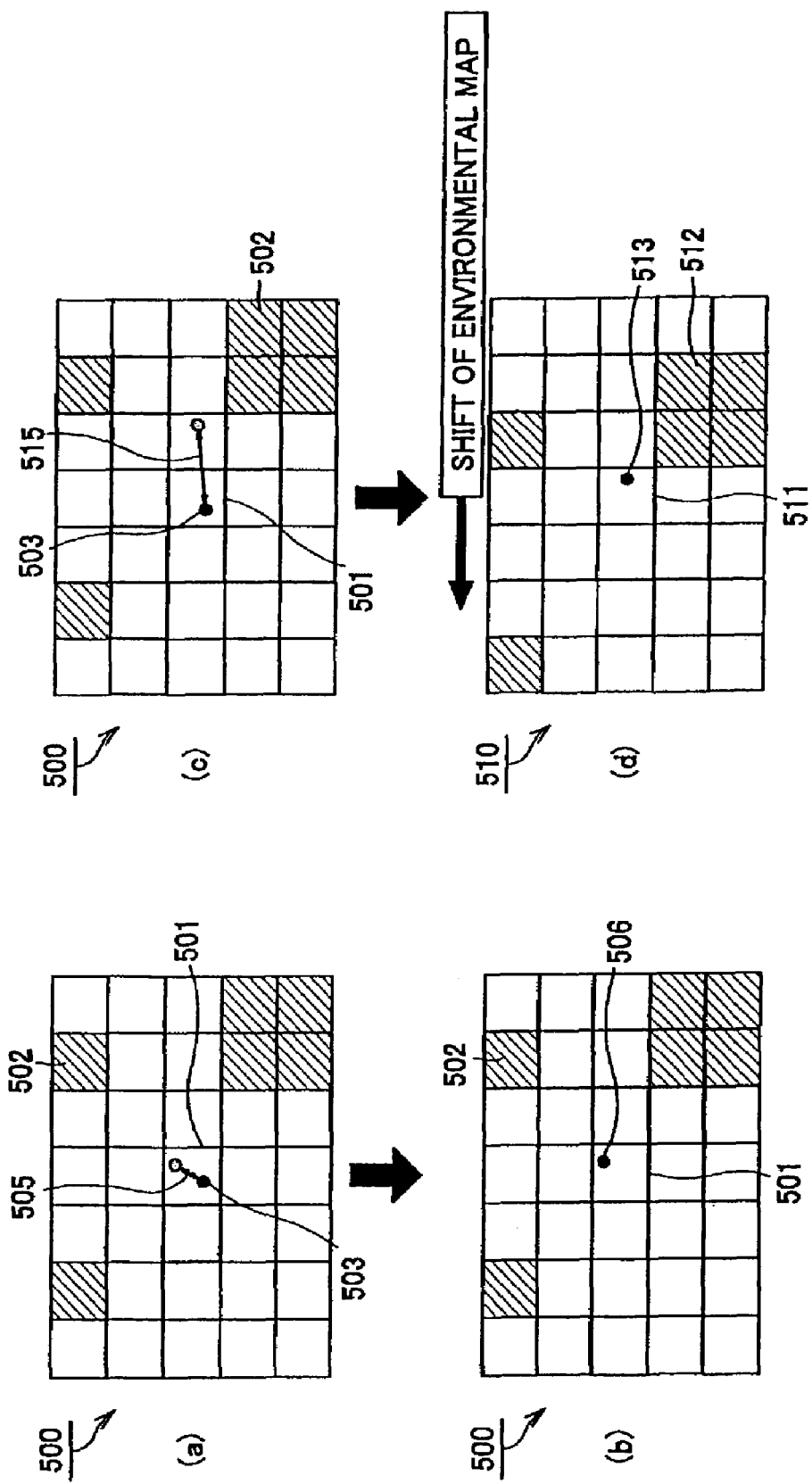

FIGS. 13(a) to 13(d) show how an environmental map is updated in an position recognition apparatus correspondingly to a travel of the robot apparatus. FIGS. 13(a) and 13(b) show one of the environmental maps being not to be updated, and FIGS. 13(c) and 13(d) show the other environmental map being to be updated. As shown in FIG. 13(a), a robot apparatus 503 is positioned within a central grid 501 of an environmental map generally indicated with a reference 500. A grid 502 shown as hatched in FIG. 13 indicates an obstacle-occupied area. When the robot apparatus 503 has moved such a short distance 505 that even a robot apparatus 506 indicating a position taken by the robot apparatus 503 having moved the distance 505 will be at the center thereof within the central grid 501 as shown in FIG. 13(b), the environmental map 500 is not updated. In this case, only information on the moved position of the robot apparatus within the central grid 501 will be updated.

On the other hand, if the robot apparatus 503 used to be within the central grid 501 of the environmental map 500 as in FIG. 13(a) has moved such a long distance 515 that the robot apparatus 503 is outside the central grid 501 as shown in FIG. 13(c), the environmental map 500 is shifted a number of grids over which the robot apparatus 503 has moved such that a robot apparatus 513 indicating a position of the robot apparatus 503 having moved the distance 515 will be within a central grid 511 of a new environmental map 510 standing for the environmental map 500 having thus been shifted as shown in FIG. 13(d).

More particularly, on the assumption that the size of a grid being a minimum unit recognizable as an obstacle-occupied area is CS (cell size), a position of the robot apparatus within the grid is (Bx, By) and a two-dimensional travel (moving distance) of the robot apparatus is (dx, dy), the magnitude of a grid shift (Sx, Sy) is given bu the following equation (3):

$$(Sx, Sy) = \left( \left[ \frac{Bx+dx}{CS} \right], \left[ \frac{By+dy}{CS} \right] \right) \quad (3)$$

where [ ] is a Gaussian symbol indicating a maximum integer value not exceeding a value within [ ]. A position (Rx, Ry) of the robot apparatus within a grid is given by the following equation (4):

$$(Rx, Ry)=(dc+CS \times Sx, dy-CS \times Sy) \quad (4)$$

Figure 14:
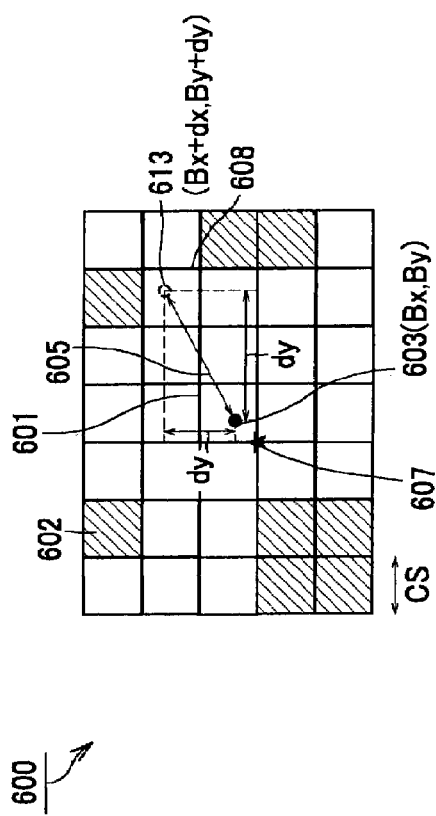
FIGS. 14(a) and 14(b) schematically show a travel of the robot apparatus, correspondingly to which the environmental map is updated in the position recognition apparatus.
Figure 14:
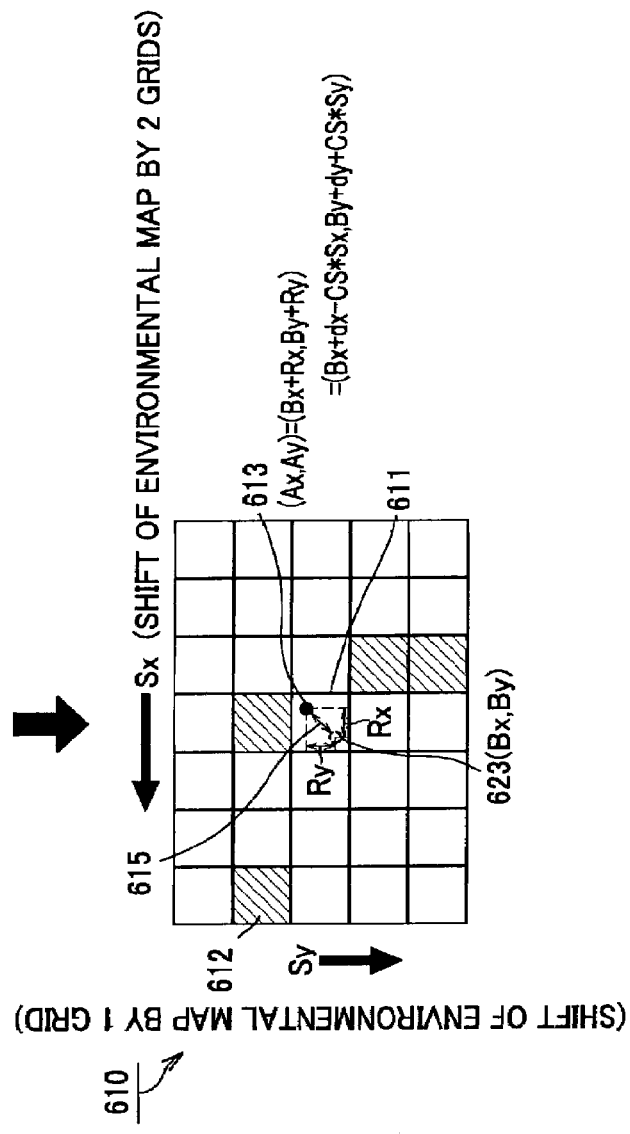
Figure 15:
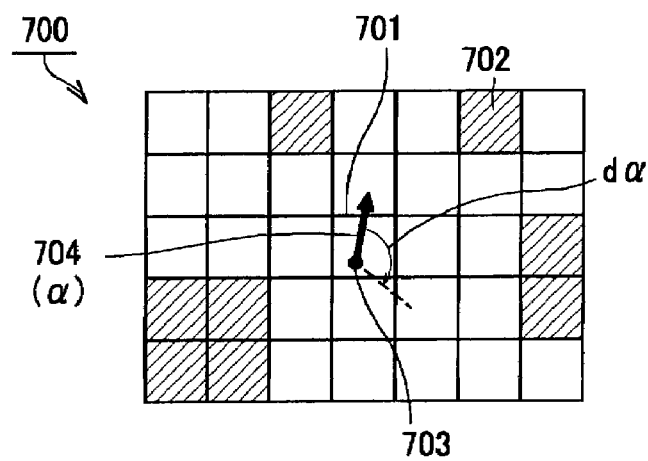
FIGS. 15(a) and 15(b) schematically show posture directions of the robot apparatus before and after the environmental map is updated, respectively.
Figure 15:
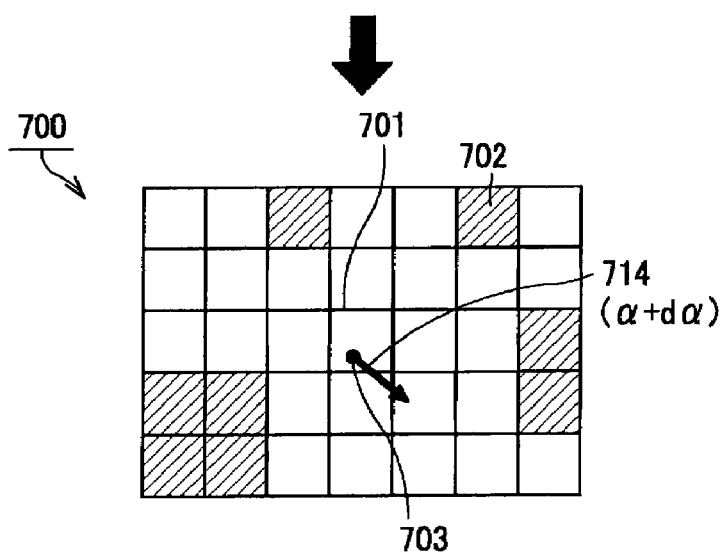

The values of the equations (3) and (4) are shown in FIG. 14. As shown in FIG. 14(a), a robot apparatus 603 is within a central grid 601 in an environmental map generally indicated with a reference 600 and composed of a plurality of grids having a grid size CS. As shown, the environmental map 600 includes a plurality of grids 602 each shown as hatched to indicate an obstacle-occupied area. It should be noted that a point 607 in the lower left corner of the central grid 601 in the environmental map 600 is taken as an origin of the position of the robot apparatus 603 within the central grid 601. This position of the robot apparatus 603 may be given as (Bx, By) as a distance from the origin 607. When the robot apparatus 603 has moved a distance (dx, dy) 605 into a grid 608, a position taken by the robot apparatus 613 having moved the distance 605 can be given by (Bx+dx, By+dy).

When the robot apparatus 603 has moved the distance (dx, dy) 605, a shift (Sx, Sy) of the environmental map can be calculated by the aforementioned formula (1). It should be noted here that an updated environmental map 610 shown in FIG. 14(b) can be updated as the environmental map 600 having been shifted an x-axial distance Sx and y-axial distance Sy oppositely to the x-axial travel dx and y-axial travel dy, respectively. Also, it should be noted that the rightward travel (dx, dy) of the robot apparatus is taken as a forward travel while the leftward shift (Sx, Sy) of the environmental map, opposite to the travel of the robot apparatus, is taken as a forward shift.

The robot apparatus 613 having thus moved will be within a central grid 611 in an updated environmental map 610. A position (Ax, Ay) within the central grid 611 of the updated environmental map 610, taken by the robot apparatus 613 after the environmental map has been shifted, can be calculated as (Ax, Ay)=(Bx+Rx, By+Ry)=(Bx+dx−CS×Sx, By+dy−CS×Sy) from the position (Bx, By), in the central grid 601 of the environmental map 600 before shifted, of the robot apparatus 603 before moved and the travel (moving distance) (Rx, Ry) 615 within the grid.

Next, how to update information on the posture direction of the robot apparatus will be described. FIGS. 15(a) and 15(b) schematically show the posture directions of the robot apparatus before and after the environmental map is updated, respectively. The posture information on the robot apparatus can be provided as an angle relative to the coordinate system in which the environmental map is fixed, that is, when the robot apparatus has the posture thereof changed by dα, only the posture direction information on the robot apparatus is updated with the environmental map not updated.

More specifically, as shown in FIG. 15(a), it is assumed that a robot apparatus 703, which is within a central grid 701 in an environmental map generally indicated with a reference 700 and including a plurality of grids 702 being obstacle-occupied areas, takes a posture direction a of before moved. The posture direction α being clockwise is assumed to be a forward one, and it can be given by an inclination relative to the y- or x-axis. On the assumption that the robot apparatus 703 is rotated through an angle dα, the posture direction (posture localizer) of the robot apparatus after moved can be given by α+dα as shown in FIG. 15(b).

Figure 16:
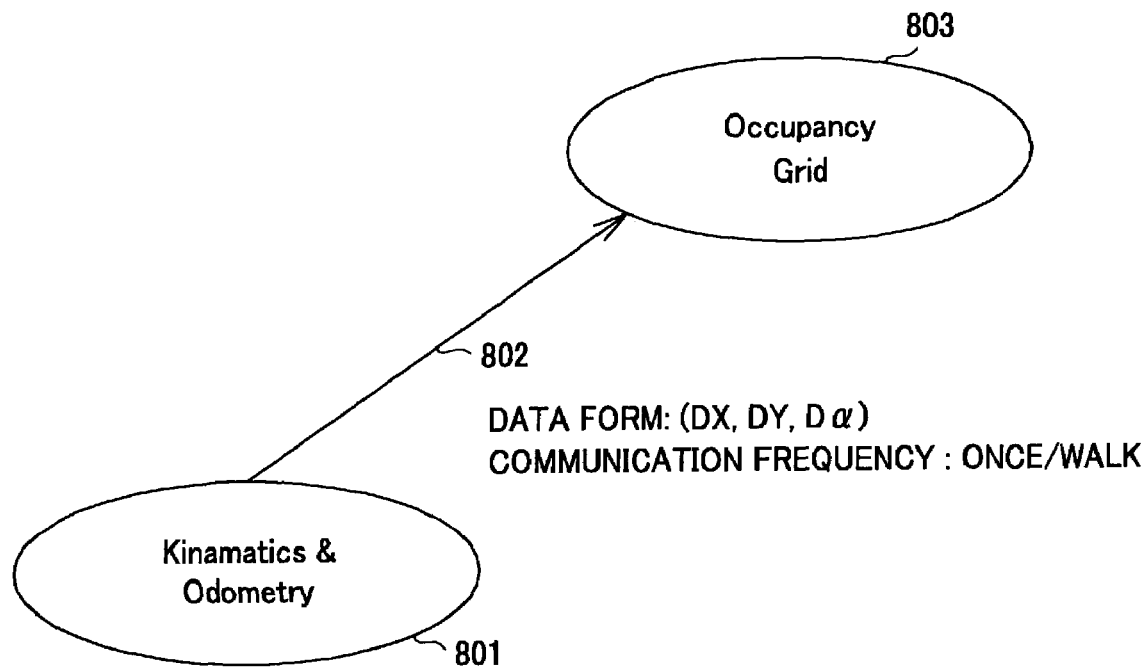
FIG. 16 a schematic diagram explaining the effect of the position recognition apparatus.

FIG. 16 a schematic diagram showing the effect of the occupancy grid calculator OG 330 the position recognition apparatus. As shown in FIG. 16, the environmental map and information on the posture direction of the robot apparatus itself can be updated, namely, a moving distance or travel (odometry) 803 can be transferred from a kinematics/odometry layer KINE 801 to an occupancy grid calculator OG 802 automatically at every predetermined time, but in this embodiment, it is done every time the robot apparatus walks one step. Thus, when the robot apparatus does not move, the environmental map is not updated, thereby saving the costs for calculation and memory copy for the updating of the environmental map, which will lead to a reduction of the load to the CPU and the like in the robot apparatus. Also, when the software works by each of the objects thereof, only a differential travel (moving distance) and differential rotation (dx, dy, dα) of the robot apparatus have to be transferred as data to the kinematics/odometry layer KINE 801. The data is smaller than data including an absolute coordinate and absolute angle of the robot apparatus, if any, to be transferred, and can be transferred with a higher accuracy.

Also, when an entertainment robot apparatus make any other recognition than the position recognition, such as sound recognition, face identification or the like, the priority of the position recognition, not related directly with such functions, may be lowered. In such a case, when the position recognition apparatus (position recognition object) is stopped from functioning, a travel of the robot apparatus being out of operation will possibly cause a problem that the position recognition once suspended and resumed because its priority has become high again will not match the result of position recognition before the position recognition function is suspended (this is called a "kidnap" problem"). Therefore, in case the priority of the position recognition may be low, increase in size CS of the environmental map grids or decrease in size of the environmental map itself makes it possible to reduce the resource of the CPU without suspending the function of the position recognition object.

Figure 17:
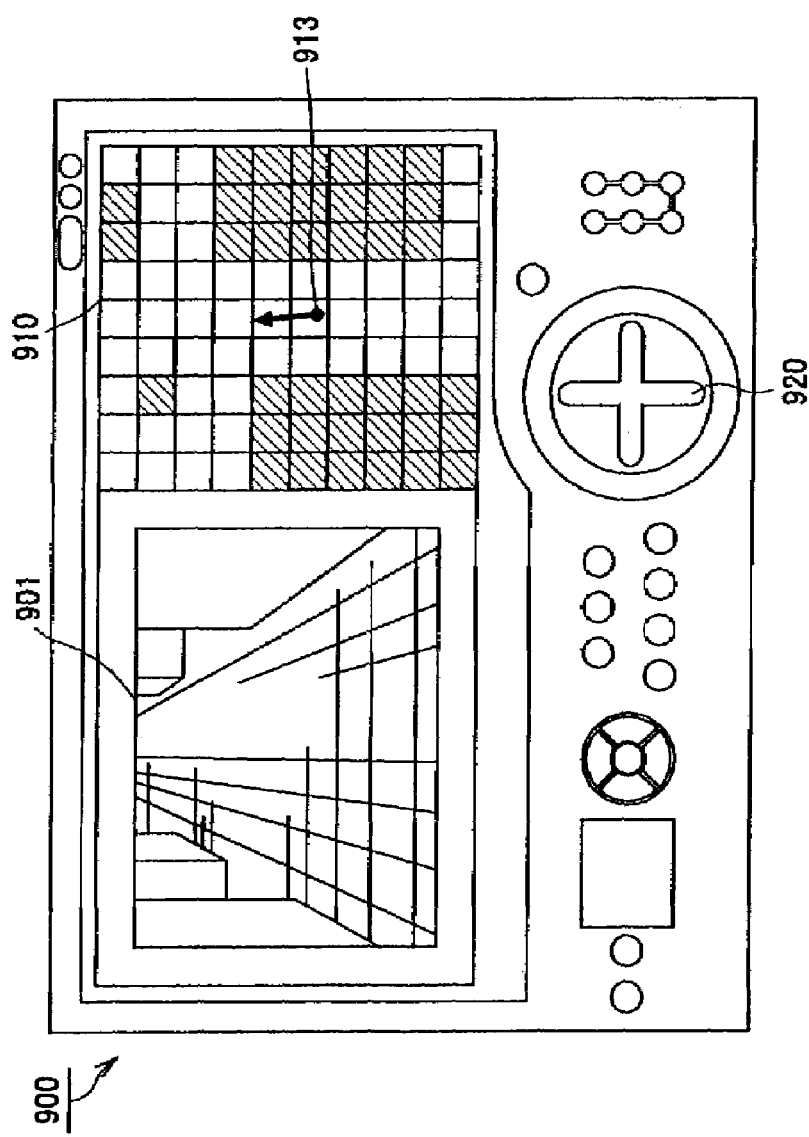
FIG. 17 schematically shows a control panel on which an environmental map and robot posture information.

Further, the environmental map and robot posture information obtained through the aforementioned operations can be displayed on a control panel shown in FIG. 17. FIG. 17 schematically shows the control panel used by the user make remote control of his or her robot apparatus, for example. As shown in FIG. 17, on the control panel generally indicated with a reference 900, there are displayed an image 901 captured by the camera installed to the robot apparatus and an environmental map 910 in which the robot apparatus appears as a point 913. The control panel 900 is also provided with controls 920 for moving the robot apparatus 913 and the like.

It is important that the mobile or locomotive robot can autonomously operate as having been described in the foregoing and can also be remote-controlled by the user. Some of the conventional robot apparatus have a control panel on which there is displayed an image picked up by the camera installed on the robot body. However, it is difficult for the user to control his robot just by viewing an image of the environment around the robot apparatus, that is supplied from such a camera. Especially, the control is more difficult with an image from a camera having a limited field of view. In this embodiment, however, since the environmental map 910 is displayed on the remote-control panel 900 in addition to the image 901 captured by a camera such as a CCD camera installed on the robot apparatus 913, the robot apparatus 913 can be controlled with a considerably higher accuracy than the conventional robot apparatus remote-controlled based on the camera data alone.

In the foregoing, it has been described that the environmental map is not updated even when the robot posture is changed. Normally, however, the robot apparatus has the imaging unit such as a CCD camera or the like installed at the front side of the head unit thereof and thus the camera-captured image 901 provides a view before the robot apparatus. Therefore, when the robot apparatus is turned 180 deg. for example correspondingly to a changed posture, the camera-captured image will be opposite in direction to the environmental map. Therefore, in case the posture is changed through an angle larger then predetermined, such as 45 deg. or 90 deg., the robot apparatus can be controlled with a much higher accuracy by turning the environmental map correspondingly to such a rotation.

Figure 18:
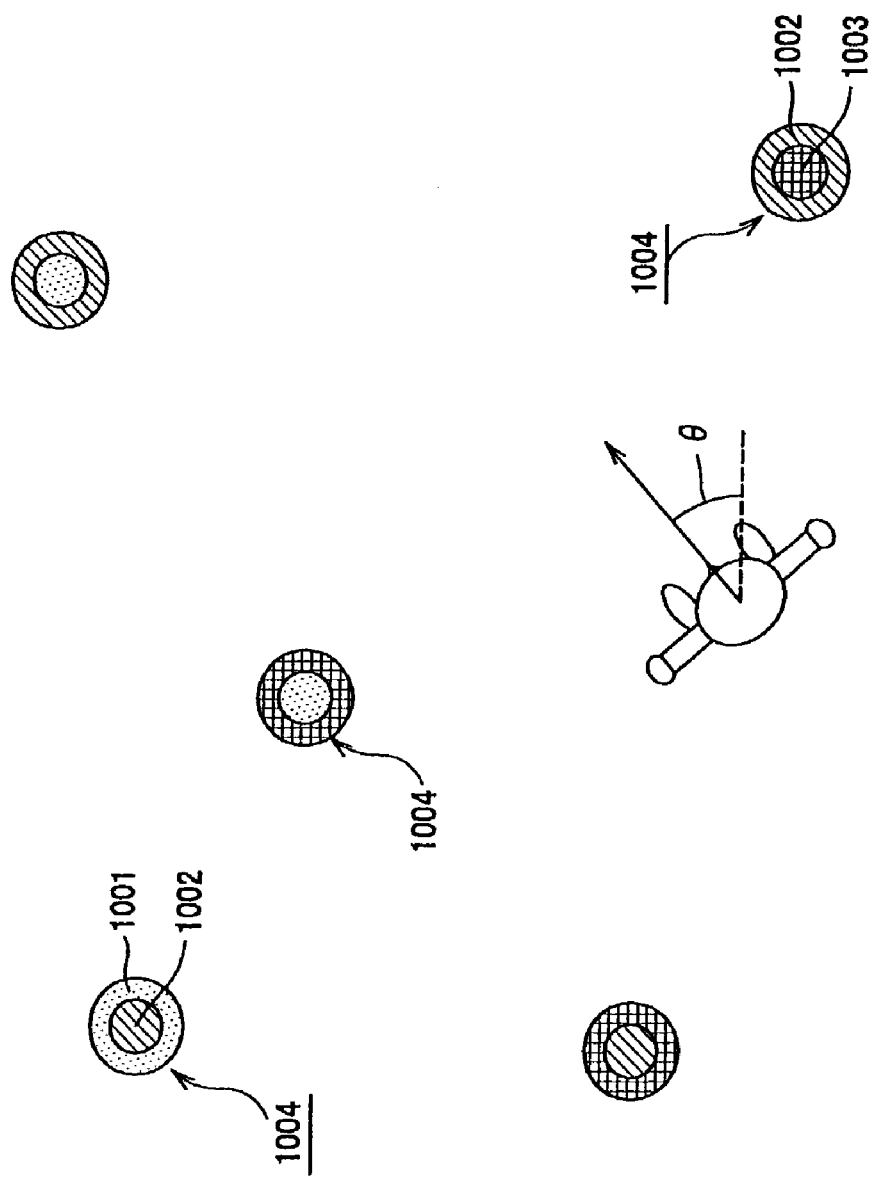
FIG. 18 schematically shows a color landmark view from a landmark sensor CLS.

The landmark sensor CLS 340 identifies, based on sensor information on the robot apparatus 1 and information on the actions made by the robot apparatus 1, the location (position and posture) of the robot apparatus in an environment including color landmarks 1004 having colors such as a green part 1001, pink part 1002 or blue part 1003, for example, as shown in FIG. 18.

The landmark sensor CLS 340 manages a robot-existence probability p(1) for a location 1 of each of grids (x, y) provided nearly regularly in a two-dimensional work space. The existence probability p(1) is updated in response to entry of a move of the robot apparatus, namely, internal observation information a or observation of the landmark, namely, external observation information s.

The existence probability p(1) depends upon an existence probability p(1') in a preceding state of the robot apparatus, namely, in a location 1' of the robot apparatus itself, and a transition probability p(1|a, 1') that the preceding state 1' shifts to the location 1 when the movement a is done in the state 1'. More specifically, a product of the existence probability p(1') that each of the preceding locations 1' is reached and transition probability (1|a, 1') that the preceding location 1' shifts to the location 1 when the movement a is done in the location 1' is added (or integrated) to provide the existence probability p(1) that the present state, namely, the location 1, of the robot apparatus itself, is reached. Therefore, when the movement a of the robot apparatus is observed as a result of the external observation, the robot-existence probability p(1) can be updated for each grid according to the following formula (5):

$$p(l) \leftarrow \sum_{l'} p(l|a, l')p(l') \tag{5}$$

Also, the existence probability p(1) that the robot apparatus is in the location 1 depends upon a transition probability p(s|1) that the landmark is observable in the existence probability p(1) and in the location 1. Therefore, when the observation of the landmark in the location 1, namely, external observation information s, is supplied to the landmark sensor CLS 340, the robot-existence probability p(1) can be updated according to the following formula (6). However, the right side of the equation (4) is normalized by dividing it by a probability p(s) that a landmark is observable.

$$p(l) \leftarrow \frac{p(s|l)p(l)}{p(s)} \tag{6}$$

Figure 19:
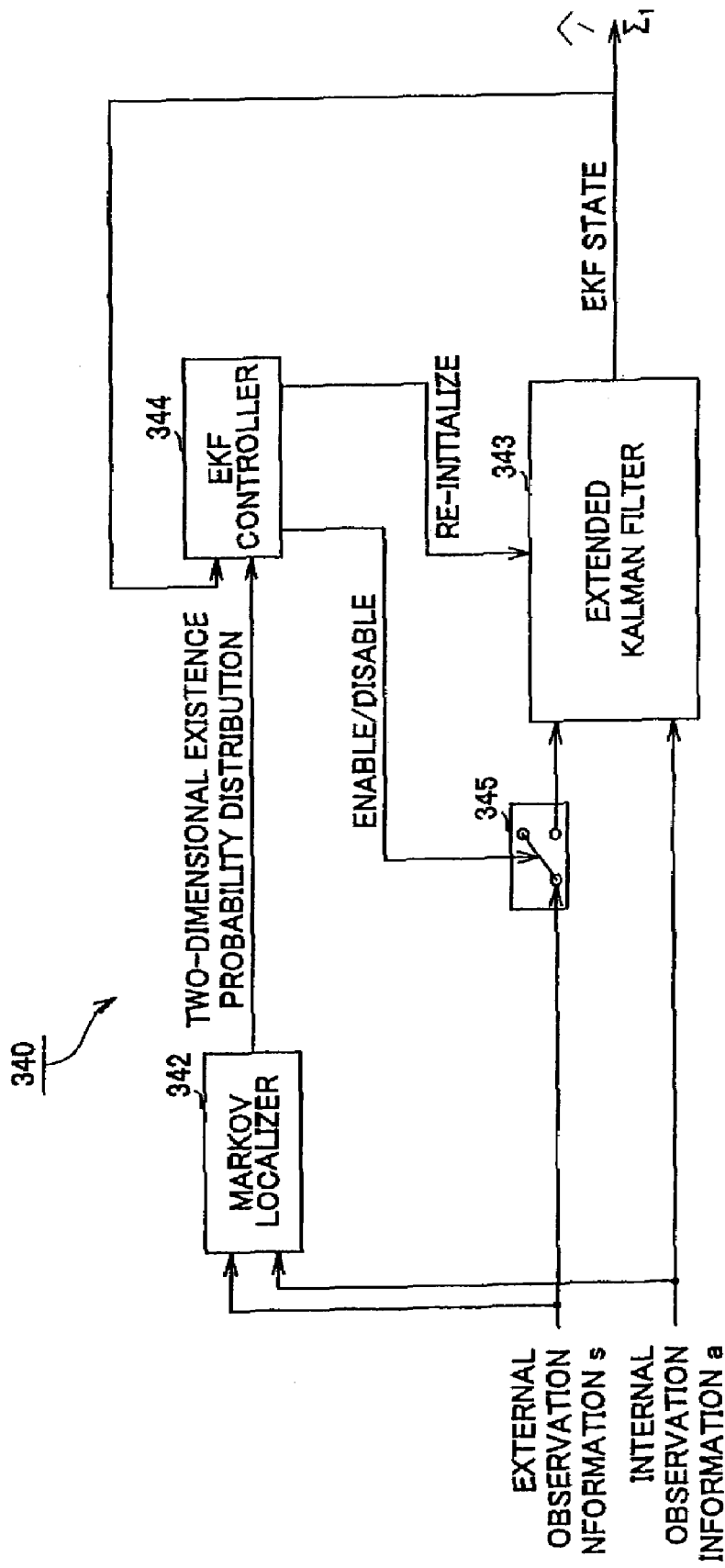
FIG. 19 is a schematic block diagram of the landmark sensor CLS.

FIG. 19 schematically shows the functional construction of the landmark sensor CLS 340 using the Markov localizer and extended Kalman filter in combination. As shown, the landmark sensor CLS 340 includes a Markov localizer ML 342, extended Kalman filter EKF 343 and an EKF controller 344 which controls the operation of the extended Kalman filter EKF 343.

The Markov localizer ML 342 holds its position in a work space as landmark probability density distribution over discrete grids, and it is supplied with external observation information s on observation of the landmark and internal observation information a on motions of the robot apparatus itself to update the landmark probability density distribution. At each time, the Markov localizer ML 342 supplies a grid whose landmark probability density distribution value is largest as the result of landmark estimation to the EKF controller 344.

Figure 20:
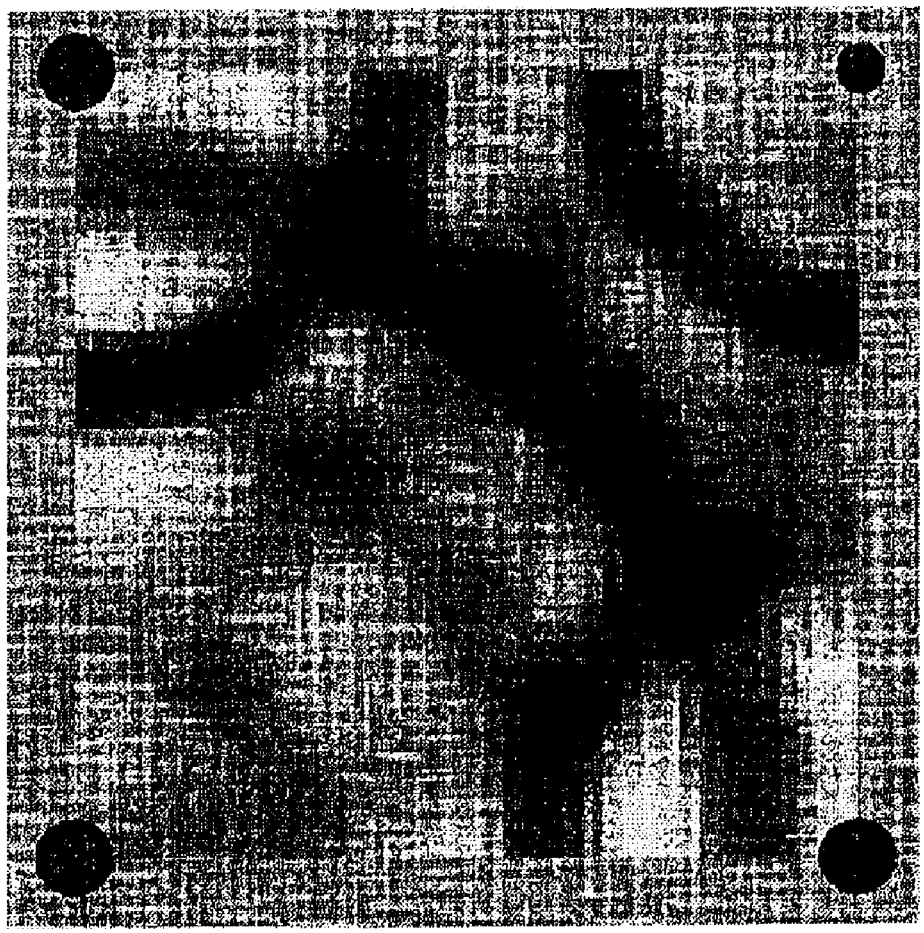
FIG. 20 schematically shows a landmark probability density distribution over grids determined by a Markov localizer.

FIG. 20 schematically shows a robot location probability density distribution over the grids determined by a Markov localizer ML 342. In FIG. 20, the probability densities in the grids are represented by shading. A darkest grid, namely, a grid having the largest robot location probability density distribution value, is the result of robot localization.

The robot location sensing by the Markov localization is featured mainly by its robustness against noises of the sensor and that the sensing can be done speedily but coarsely.

On the other hand, the extended Kalman filter EKF 343 shown in FIG. 19 holds a robot location as measured state variables [x, y, θ]. Once the color landmarks 1004 provided in the environment are observed, the extended Kalman filter EKF 343 estimates the robot locations on the basis of a position in relation to the landmarks. Also, when information on the action of the robot apparatus is observed, the extended Kalman filter EKF 343 estimates a state quantity on the basis of the motion information.

The extended Kalman filter EKF 343 is composed of a state model defining a relation between the motion information a on the robot apparatus itself and state, namely, location 1, and an observation model defining a relation between the robot location 1 and landmark observation information s.

The state model has a transition function F (1,a) by which the robot apparatus gives a theoretical state 1 when it has made the action a in the state (location) 1. Actually, since a noise component w is superposed on the theoretical state 1, the state 1 of the robot apparatus is given by the following formula (7) on the basis of the state model:

$$1 \leftarrow F(1,a)+w \quad (7)$$

Also, the observation model is composed of an observation function H (Env, 1) by which the robot apparatus gives an observation theoretical value s as to a known environment Env (position of a landmark, for example) when it is in a state, namely, in the location 1. Actually, since a noise component v is superposed on the observation theoretical value, the observation value s is given by the following formula (8) on the basis of the observation model:

$$s \leftarrow H(Env,1)+v \quad (8)$$

Note that the noise components w and v superposed on the state 1 and observation s, respectively, are assumed as Gaussian distributions, respectively, taking zero as a central value thereof.

In the extended Kalman filter EKF 343 having the state model defining the relation between the motion information a on the robot apparatus itself and location 1 and the observation model defining the relation between the robot location 1 and landmark observation information s, the motion information a is known as a result of internal observation and the landmark observation information s is known as a result of external observation. Therefore, the position of the robot apparatus can be identified through estimation of the state 1 of the robot apparatus on the basis of the motion information a of the robot apparatus and observation information s. In this embodiment, the robot's motion a, state 1 and observation s can be represented by the following Gaussian distributions, respectively:

a: Gaussian distribution with median $a_{med}$ and covariance $\Sigma_a$ s: Gaussian distribution with median $s_{med}$ and covariance $\Sigma_s$ l: Gaussian distribution with median $1_{med}$ and covariance $\Sigma_1$ The state 1 of the robot apparatus at a time is estimated on the assumption that it shows a Gaussian distribution having a certain median and covariance. Then, when the motion a of the robot apparatus is found, the median and covariance concerning the estimated state 1 can be updated using the following formulae (9-1) and (9-2):

$$1_{med} \leftarrow F(1_{med}, a_{med}) \quad (9\text{-}1)$$

$$\Sigma_1 \leftarrow \nabla F_1 \Sigma_1 \nabla F_1^T + \nabla F_a \Sigma_a \nabla F_a^T \quad (9\text{-}2)$$

where $\nabla F_1$ and $\nabla F_a$ are given by the following:

$\nabla F_1$: Jacobian matrix given by ∂F/∂1

$\nabla F_a$: Jacobian matrix given by ∂F/∂a

Similarly, the state 1 of the robot apparatus at a time is estimated on the assumption that it shows a Gaussian distribution having a certain median and covariance. Then, when the landmark observation information s is found, the median and covariance concerning the estimated state 1 can be updated using the following formulae (10-1) and (10-2):

$$1_{med} \leftarrow 1_{med} + Wv_{med} \quad (10\text{-}1)$$

$$\Sigma_1 \leftarrow \Sigma_1 - W\Sigma_v W^T \quad (10\text{-}2)$$

where W: Kalman filer gain given by $W = \Sigma_1 \nabla H_1^T \Sigma_p^{-1}$ $v_{med}$: Median of landmark observation error given by $v_{med} = s_{med} - H(Env, 1_{med})$ $\Sigma v$: Covariance of landmark observation error given by $\Sigma_v = \Sigma_s + \nabla H_1 \Sigma_1 + \nabla H_1^T$ $\nabla H_1$: Jacobian matrix given by ∂H/∂1

Since the extended Kalman filter EKF 343 is very robust to the sensor data, the result of estimation from the extended Kalman filter EKF 343 is taken as the entire output from the landmark sensor CLS 340.

The extended Kalman filter (EKF) controller 344 controls the operation of the extended Kalman filter EKF 344 according to the output from the Markov localizer ML 342. More specifically, the EKF controller 344 verifies the validity of the landmark observation information s on the basis of the result of robot localization by the Markov localizer ML 342. The EKF controller 344 can judge the validity of the observation information s depending upon whether the probability p(s|mlp) in which a landmark is found in a grid position mlp where the existence probability is maximum in the Markov localizer ML 342 exceeds a predetermined threshold.

In case the probability p(s|mlp) that a landmark is found in the grid position mlp is smaller than the threshold, it is estimated that even the Markov localizer ML 342 robust to sensor noises has not perform its function to the satisfactory extent. In such a case, even if the extended Kalman filter EKF 343 not so robust to sensor noises is used to estimate the robot location, it will not be able to provide accurate estimation but will rather waste the time for calculation. So, when the observation information s is judged not to be valid, a selector 345 shown in FIG. 19 is used to block entry to the extended Kalman filter EKF 343 of the external observation information s, that is, landmark observation information, thereby ceasing the updating of the robot location in the extended Kalman filter EKF 343.

Also, the EKF controller 344 verifies the validity of the result of robot localization made by the extended Kalman filter EKF 343. The validity of the robot localization result can be judged by a distribution comparison test in which the estimation result is compared with the existence probability p(1) supplied from the Markov localizer ML 342 using a median and covariance of the estimated state 1. The distribution comparison test includes a chi-square test ((ml , EKF), for example.

If the distribution comparison test has proved that the probability distribution estimated by the Markov localizer ML 342 and that by the extended Kalman filter EKF 343 are not similar to each other, it can be determined that the robot localization by the extended Kalman filter EKF 343 not robust to sensor noises is not valid because of the influence of the sensor noises. In this case, the EKF controller 344 re-initializes the extended Kalman filter EKF 343 because it takes much time for restoration to its normal state.

Figure 21:
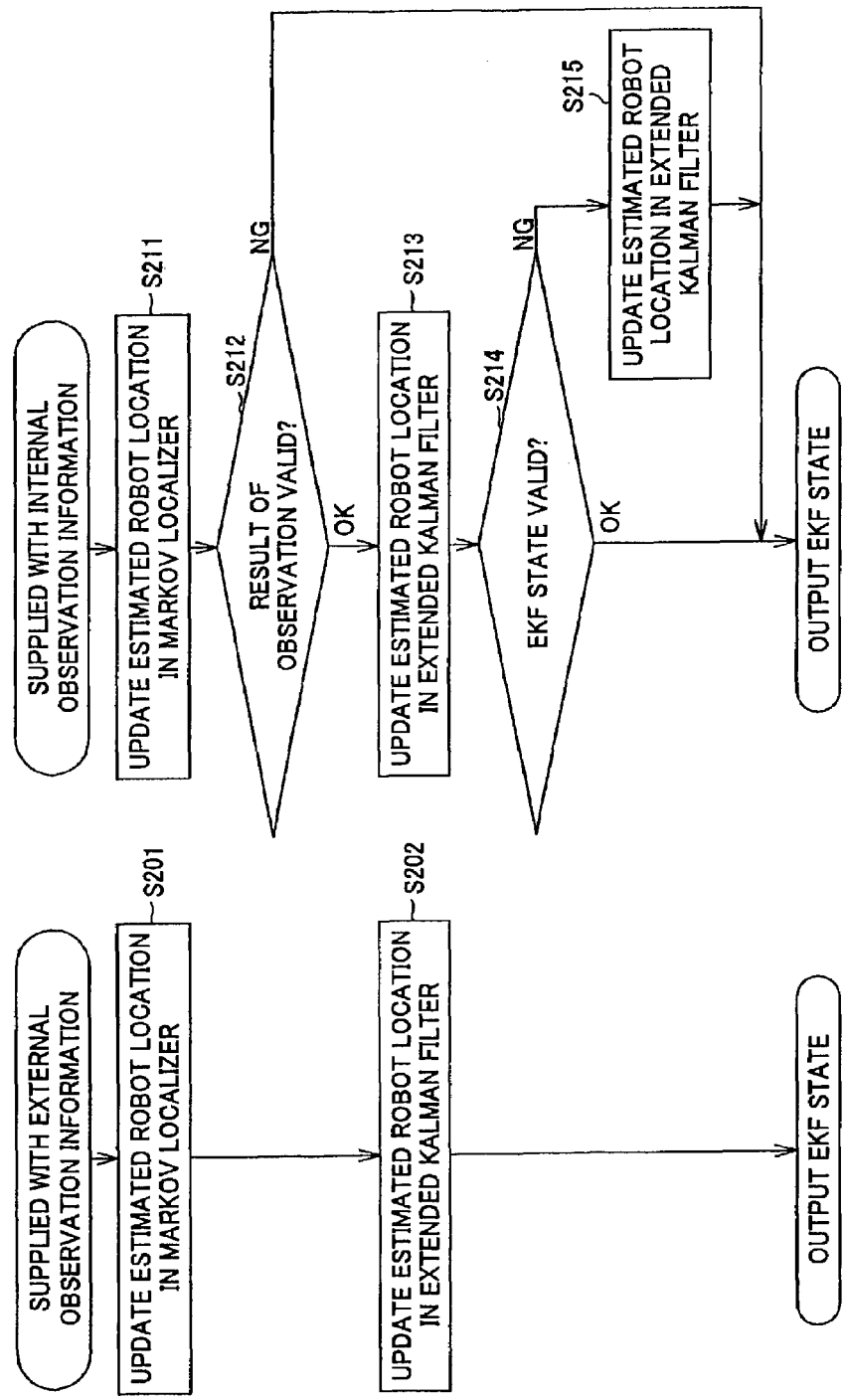
FIG. 21 shows a flow of operations of the landmark sensor CLS.

The aforementioned landmark sensor CLS 340 functions as will be described below. FIG. 21 shows a flow of operations of the landmark sensor CLS 340. As shown in FIG. 21, when the landmark sensor CLS 340 is supplied with internal observation information a as to a movement of the robot apparatus 1, the EKF controller 344 will first update the estimated robot location in the Markov localizer ML 342 using the aforementioned formula (5) (step S201). Next, the EKF controller 344 will update the estimated robot location in the extended Kalman filter EKF 343 using the formulae (9) (step S202).

Also, when external observation information s on an observation of the landmark is supplied to the landmark sensor CLS 340, the EKF controller 344 will first update the estimated robot location in the Markov localizer ML 342 using the formula (6) (step S211).

The output from the Markov localizer ML 342 is supplied to the EKF controller 344 which in turn will verify the validity of the observation information s (step S212). The EKF controller 344 can judge the validity of the observation information s depending upon whether the probability p(s|mlp) in which a landmark is found in a grid position mlp where the existence probability is maximum in the Markov localizer ML 342 exceeds a predetermined threshold.

In case the probability p(s|mlp) that a landmark is found in the grid position mlp is smaller than the threshold, it is estimated that even the Markov localizer ML 342 robust to sensor noises has not perform its function to the satisfactory extent. In such a case, even if the extended Kalman filter EKF 343 not so robust to sensor noises is used to estimate the robot location, it will not be able to provide accurate estimation but will rather waste the time for calculation. So, when the observation information s is judged not to be valid, a selector 345 shown in FIG. 19 is used to block entry to the extended Kalman filter EKF 343 of the external observation information s, that is, landmark observation information, thereby ceasing the updating of the robot location in the extended Kalman filter EKF 343.

On the other hand, when the verification of the observation information s shows that the observation information s is valid, namely, the probability p(s|mlp) that the landmark is found in the grid position mlp exceeds the threshold, the EKF controller 344 will further update will further update the estimated robot location in the extended Kalman filter EKF 343 using the formulae (10-1) and (10-2) (step S213).

The result of the robot localization estimation by the extended Kalman filter EKF 343 is supplied to the EKF controller 344 which will verify the validity of the estimated robot location (step S214). The validity of the robot localization by the extended Kalman filter EKF 343 can be judged by a distribution comparison test in which the estimation result is compared with the existence probability p(1) supplied from the Markov localizer ML 342 using a median and covariance of the estimated state 1. For the distribution comparison test, there is available the chi-square test ((ml, EKF) by way of example.

If the distribution comparison test has proved that the probability distribution estimated by the Markov localizer ML 342 and that by the extended Kalman filter EKF 343 are not similar to each other, it can be determined that the robot location estimated by the extended Kalman filter EKF 343 not robust to sensor noises is not valid because of the influence of the sensor noises (step S215). In this case, the EKF controller 344 re-initializes the extended Kalman filter EKF 343 because it takes much time for restoration to its normal state.

Thus, the landmark sensor CLS 340 can identify a robot location accurately, speedily and robustly using a global search destined for a wide range and which can be done in a relatively short time and a local search destined for a limited range and which is accurate, speedy and robust, in combination.

Then, the situated behavior layer SBL 360 acquires a result of recognition of an obstacle existing around the robot apparatus 1 from the obstacle grid information 331 supplied from the occupancy grid calculator OG 330, and the present absolute coordinate of the robot apparatus 1 from the absolute coordinate localizer LZ 350, to thereby plan a route along which the robot apparatus 1 can walk, that is, a walkable route, to a destination designated in the absolute coordinate system or robot-centered coordinate system and issue an action command for moving along the planned route. Namely, the situated behavior layer 360 will decide a behavior the robot apparatus 1 has to perform, based on the input data and depending upon the situations. The situated behavior layer SBL 360 functions based on the obstacle grid information 331 supplied from the occupancy grid calculator OG 330 as will be described later.

Figure 22:
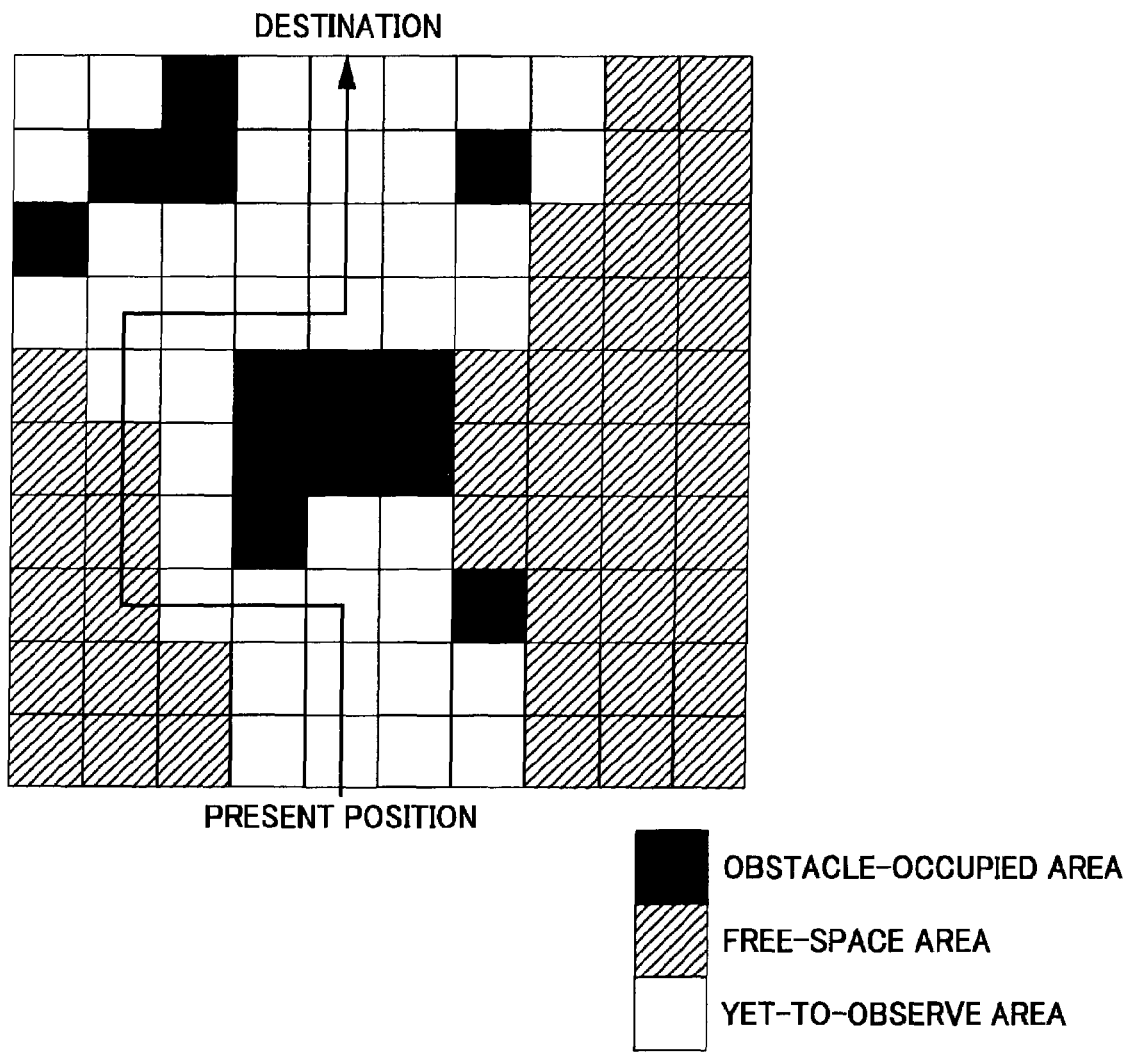
FIG. 22 shows a route from a present position to a destination, depicted in an obstacle map produced based on obstacle grid information.

An obstacle map produced based on the obstacle grid information 331 from the occupancy grid calculator OG 330 is composed of three types of areas as shown in FIG. 22.

The first one of the three types of map areas is a one occupied by an obstacle (black in FIG. 22). The second area is a one free from any obstacle (blank in FIG. 22), and the third area is a one not yet observed (hatched in FIG. 22).

Figure 23:
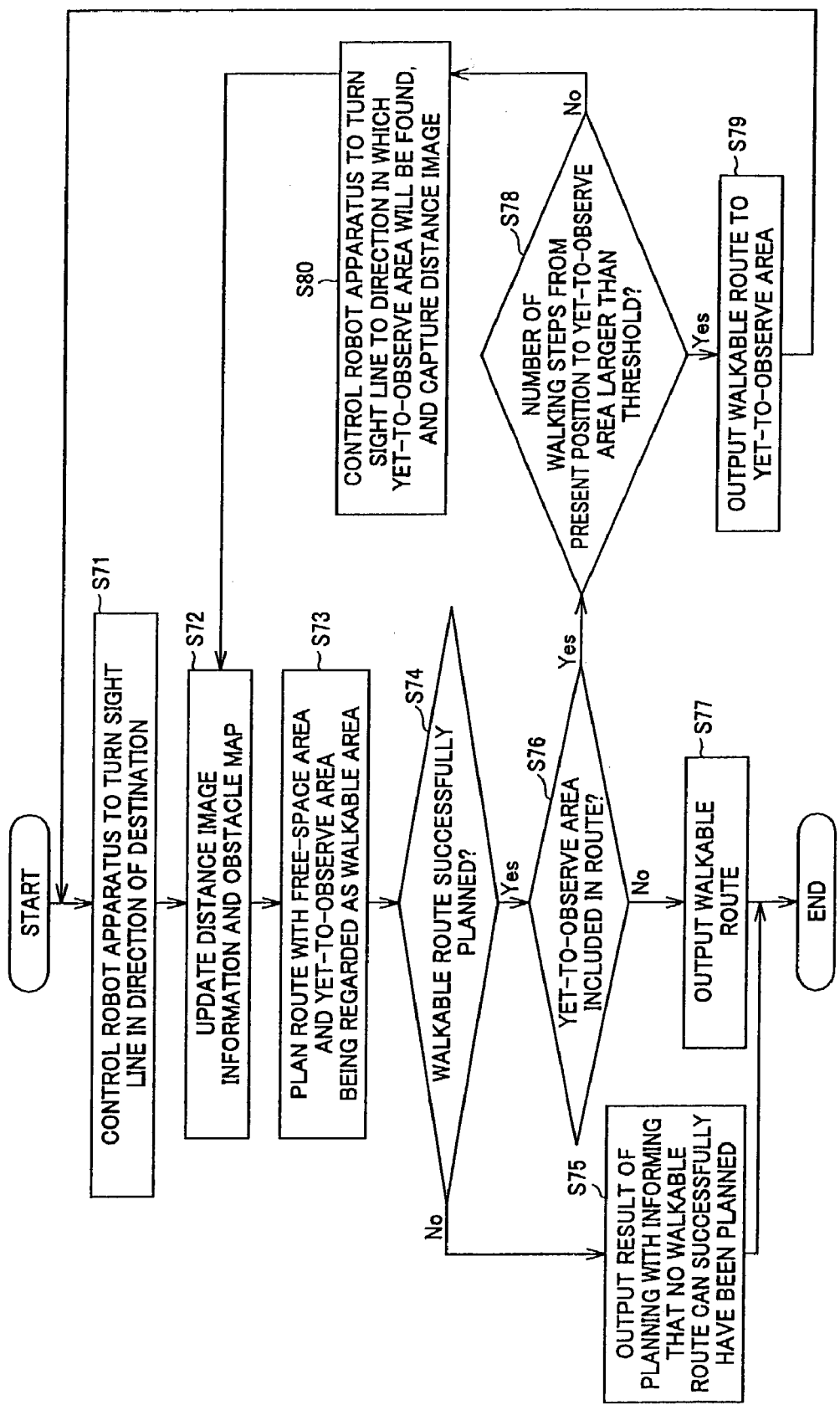
FIG. 23 shows a flow of operations made according to a route planning algorithm.

Next, a route planning algorithm employed in the situated behavior layer SBL 360 will be described in detail with reference to a flow chart in FIG. 23.

First, the situated behavior layer SBL 360 controls the robot apparatus 1 to turn its sight line to a destination to produce an obstacle map showing a obstacle or obstacles laid along a straight route extending from the present position to the destination (step S71). Then, a distance image or disparity image is acquired to measure a distance between the present position and destination, and the obstacle map is produce or the existing obstacle map is updated (step S72).

Next, a route is planned in the obstacle map thus produced with the yet-to-observed area and free-space area being regarded as walkable areas (step S73).

In this embodiment, a walking route is planned by a method called "A* search", for example, capable of minimizing the costs for an entire route. The "A* search" method provides a best priority search using f as a performance function and in which the h function is admissible In step S74, the situated behavior layer SBL 360 judges whether the route planned by the "A* search" method in step S73 is a walkable one. When the situated behavior layer SBL 360 has determined that the robot apparatus 1 cannot detour around any obstacle along the route (NO), it exits the route planning with informing that any further search will not make it possible to plan a walkable for the robot apparatus 1 (step S75).

If the situated behavior layer SBL 360 has determined that the route planned by the "A* search" method for example in step S73 is a walkable one (YES), it goes to step S76 where it will search for any yet-to-observe area included in the planned route output. If it is determined in step S76 that no yet-to-observe area is included in the planned route output (NO), the situated behavior layer SBL 360 outputs, in step S77, the walkable route as a planned route to the destination. When it is determined in step S76 that any yet-to-observe area is included in the planned route output (YES), the situated behavior layer SBL 360 goes to step S78 where it will calculate a number of walking steps from the present position to the yet-to-observe area and judge whether the number of steps exceeds a threshold.

If the situated behavior layer SBL 360 has determined in step S78 that the number of walking steps exceeds the threshold (YES), it outputs the walkable route to the yet-to-observe area in step S79. On the contrary, the situated behavior layer SBL 360 has determined in step S78 that the number of walking steps is smaller than the threshold (NO), it will control the direction of viewing to measure the distance to the yet-to-observe area and retry the observation (step S80), and update the obstacle map again.

Employing the aforementioned route planning algorithm, the situated behavior layer SBL 360 plans a route with the yet-to-observe area and free-space area being regarded as walkable area, and re-observe only a yet-to-observe area included in the planned route output, whereby it can plan a walkable route efficiently and in a shorter time without execution of any observation and distance image calculation, not required for moving to the destination.

A bipedal walking robot apparatus having installed therein the aforementioned position recognition apparatus according to the present invention will be described in detail below. This humanoid robot apparatus is practically usable to support the human activities in various situations in the living environment and daily life. It is also an entertainment robot which can behave correspondingly to its internal states (anger, sadness, joy, pleasure, etc.) and also do basic motions like those the human beings do.

Figure 24:
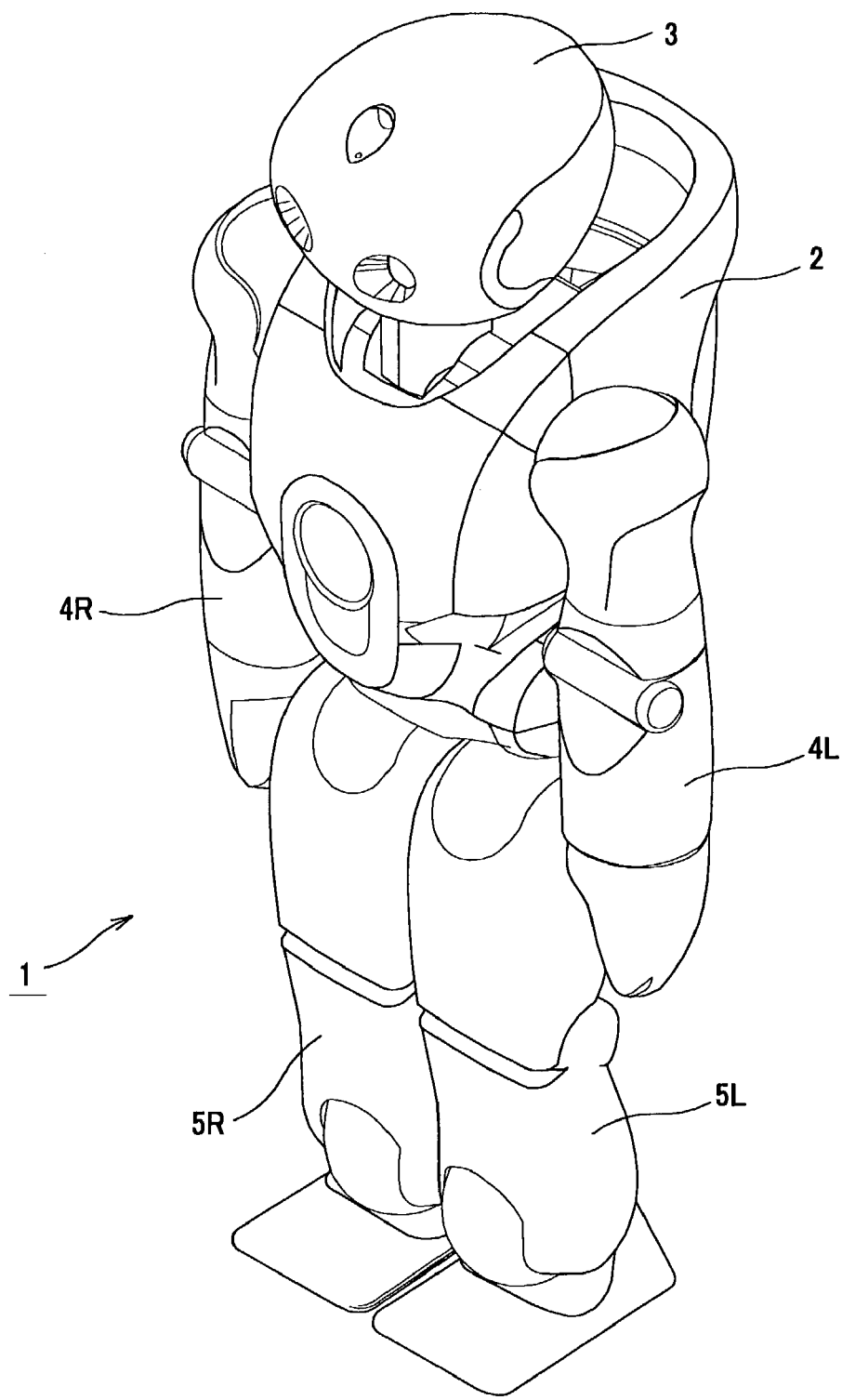
FIG. 24 is a perspective view showing the appearance of the embodiment of the robot apparatus according to the present invention.

FIG. 24 is a perspective view of the embodiment of the robot apparatus 1 according to the present invention, showing the components forming together the robot apparatus 1. As shown, the robot apparatus 1 is composed of a body unit 2, head unit 3 coupled to a predetermined portion of the body unit 2, two arm units, right and left, 4R and 4L, and two leg units, right and left, 5R and 5L. The "R" and "L" stand for "right" and "left", respectively.

Figure 25:
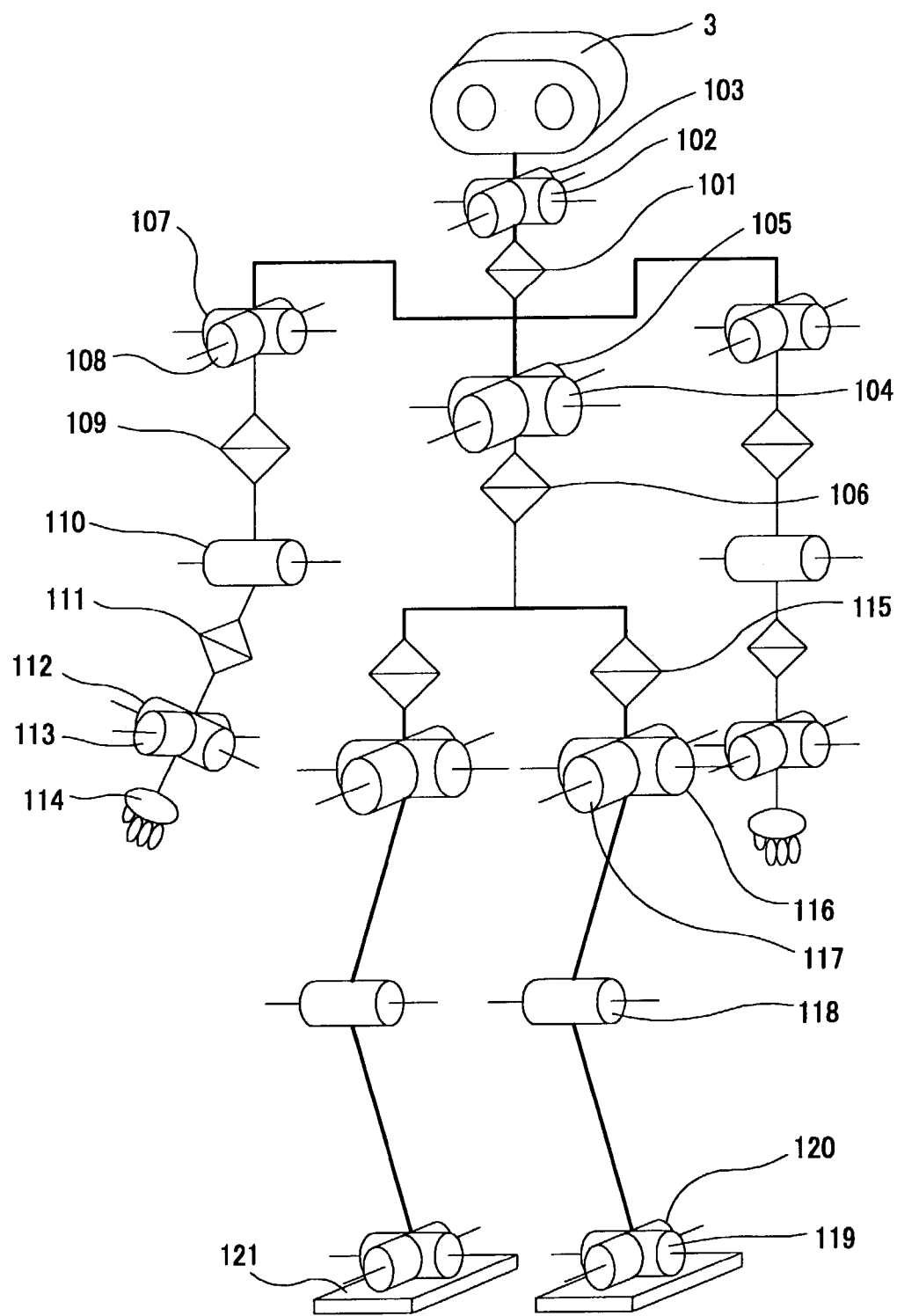
FIG. 25 schematically shows a degree-of-freedom model of the robot apparatus in FIG. 24.

FIG. 25 schematically shows the degree-of-freedom construction of each of the joints of the robot apparatus 1 in FIG. 24. The neck joint supporting the head unit 3 has three degrees of freedom including a neck-joint yaw axis 101, neck-joint pitch axis 102 and a neck-joint roll axis 103.

Each of the arm units 4R and 4L forming the upper limb consists of a shoulder-joint pitch axis 107, shoulder-joint roll axis 108, upper-arm yaw axis 109, elbow-joint pitch axis 110, lower-arm yaw axis 111, wrist-joint pitch axis 112, wrist-joint roll axis 113 and a hand 114. The human hand is actually a multi-joint, multi-degree-of-freedom structure including a plurality of fingers. However, since the motion of the hand 114 is little contributed to or have little influence on the posture control and walking control on the robot apparatus 1, so the hand 114 is assumed herein to have no degree of freedom. Therefore, each of the arm units 4R and 4L has seven degrees of freedom.

The body unit 2 has three degrees of freedom including a body pitch axis 104, body roll axis 105 and a body yaw axis 106.

Each of the leg units 5R and 5L is composed of a hip-joint yaw axis 115, hip-joint pitch axis 116, hip-joint roll axis 117, knee-joint pitch axis 118, ankle-joint pitch axis 119, ankle-joint roll axis 120, and a foot 121. In this embodiment, the hip-joint pitch axis 116 and hip-joint roll axis 117 define together the position of the hip joint of the robot apparatus 1. The human foot is actually a multi-joint, multi-degree of freedom structure including the foot sole. However, the foot sole of the robot apparatus 1 has no degree of freedom. Therefore, each of the leg units has six degrees of freedom.

In effect, the robot apparatus 1 has a total of 32 degrees of freedom (=3+7 ×2+3+6×2). However, the degrees of freedom of the entertainment robot 1 is not always limited to the thirty two but the number of joints, namely, degrees of freedom, may be increased or decreased appropriately correspondingly to any restrictions and required specifications in designing and producing the robot apparatus 1.

Each of the above degrees of freedom of the robot apparatus 1 are actually implemented by a corresponding actuator. The actuator should preferably small and lightweight since the robot apparatus 1 should have no more unnecessary bulging than necessary but have a body shape extremely approximate to the natural bodily shape of the human being and the bipedal walking type robot is difficult to control in posture because of its unstable structure.

Figure 26:
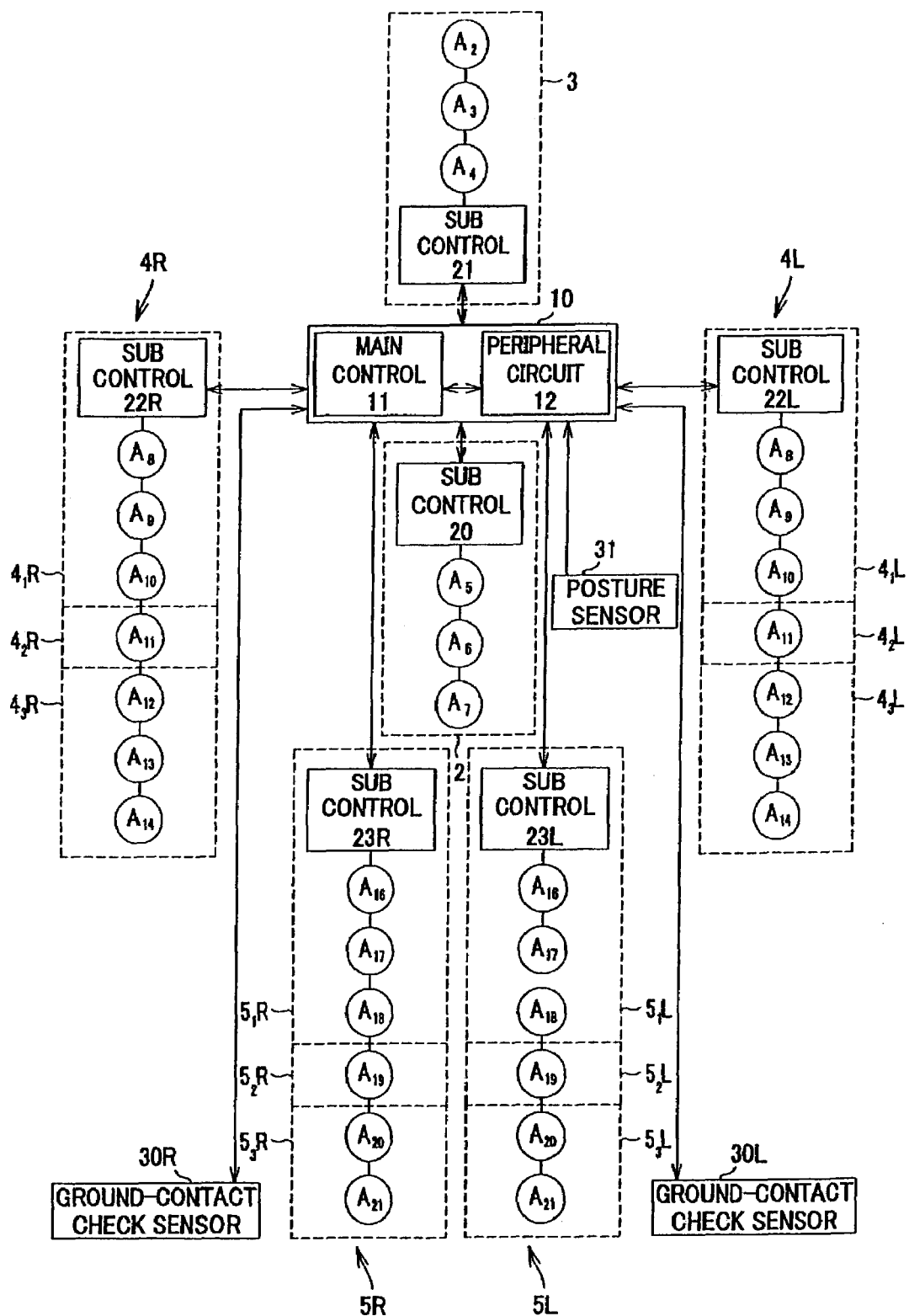
FIG. 26 is a block diagram showing the circuit construction of the robot apparatus in FIG. 24.

FIG. 26 schematically show the control system of the robot apparatus 1. As shown, the robot apparatus 1 includes the body unit 2, head unit 3, arm units 4R and 4L and leg units 5R and 5L, which form together a humanoid structure, and also a control unit 10 which provides an adaptive control to allow coordinated motions of the bodily component units.

The control unit 10 controls the operation of the entire robot apparatus 1 synthetically. The control unit 10 includes a main controller 11 composed of main circuit components such as a CPU (central processing unit), DRAM, flash memory, etc. (not shown), and a peripheral circuit 12 including a power circuit and interfaces (not shown) for transfer of data and command to and from the components of the robot apparatus 1.

The control unit 10 may be installed anywhere as necessary. It is installed in the body unit 2 in this embodiment as shown in FIG. 26. But, the location of the control unit 10 is not limited to any special place. The control unit 10 may be installed in the head unit 3. Alternatively, the control unit 10 may be provided outside the robot apparatus 1 and arranged to communicate with the robot apparatus 1 proper via a cable or radio connection.

Each of the degrees of freedom in the robot apparatus 1 shown in FIG. 26 is implemented by a corresponding actuator. Specifically, the head unit 3 has provided therein a neck-joint yaw-axis actuator $A_2$, neck-joint pitch-axis actuator $A_3$ and a neck-joint roll-axis actuator $A_4$, implementing the neck-join yaw axis 101, neck-joint pitch axis 102 and neck-joint roll axis 103, respectively.

The head unit 3 has provided therein a CCD (charged coupled device) camera to capture the external situations, and also a distance sensor to measure a distance to an object standing before the robot apparatus 1, a microphone to collect external sounds, a speaker to output a voice or sound, a touch sensor to detect a pressure applied to the head unit 3 by a user's physical action such as "patting" or "hitting", etc.

The body unit 2 has provided therein a body pitch-axis actuator $A_5$, body roll-axis actuator $A_6$ and a body yaw-axis actuator $A_7$, implementing the body pitch axis 104, body roll axis 105 and body yaw axis 106, respectively. Also, the body unit 2 incorporates a battery to power the robot apparatus 1. This battery is a rechargeable type.

Each of the arm units 4R and 4L is composed of sub units including a upper arm unit $4_1R$ ($4_1L$), elbow joint unit $4_2R$ ($4_2L$) and lower arm unit $4_3R$ ($4_3L$), and it has provided therein a shoulder-joint pitch-axis actuator $A_8$, shoulder-joint roll-axis actuator $A_9$, elbow-joint roll-axis actuator $A_{10}$, elbow-joint pitch-axis actuator $A_{11}$, elbow-joint roll-axis actuator $A_{12}$, write-joint pitch-axis actuator $A_{13}$ and write-joint roll-axis actuator $A_{14}$, implementing the shoulder-joint pitch axis 107, shoulder-joint roll axis 108, elbow-joint roll axis 109, elbow-joint pitch axis 110, lower-arm yaw axis 111, write-joint pitch axis 112 and write-joint roll axis 113, respectively.

Also, each of the leg units 5R and 5L is composed of sub units including a femoral unit $5_1R$ ($5_1L$), knee unit $5_2R$ ($5_2L$) and tibial unit $5_3R$ ($5_3L$), and it has provided therein a femoral-joint yaw-axis actuator $A_{16}$, femoral-joint roll-axis actuator $A_{17}$, femoral-joint roll-axis actuator $A_{18}$, knee-joint pitch-axis actuator $A_{19}$, angle-joint pitch-axis actuator $A_{20}$ and ankle-joint roll-axis actuator $A_{21}$, implementing the femoral-joint yaw axis 115, femoral-joint roll axis 116, femoral-joint roll axis 117, knee-joint pitch axis 118, angle-joint pitch axis 119 and ankle-joint roll axis 120, respectively.

It is more preferable that each of the aforementioned actuators $A2, A3, \ldots$ used in the joints can be formed from a small AC servo actuator having a directly-coupled gear and one-chip servo control system thereof installed in a motor unit.

Also, the body unit 2, head unit 3, arm units 4R and 4L and leg units 5R and 5L are provided with sub controllers 20, 21, 22R and 22L, and 23R and 23L, respectively, for controlling the driving of the actuators. Further, the leg units 5R and 5L have ground-contact check sensors 30R and 30L, respectively, to detect whether the foot soles of the leg units 5R and 5L are in contact with the ground or floor surface, and the body unit 2 has installed therein a posture sensor 31 to measure the robot posture.

Each of the ground-touch sensors 30R and 30L is composed of a proximity sensor, micro switch or the like installed on the foot sole for example. Also, the posture sensor 31 is a combination of an acceleration sensor and giro sensor, for example.

The output from each of the ground-contact sensor 30R or 30L permits to judge whether the right or left leg unit is currently standing at the foot sole thereof on the ground or floor surface or idling while the robot apparatus 1 is walking or running. Also, the output from the posture sensor 31 permits to detect an inclination of the body unit and posture of the robot apparatus 1.

The main controller 11 can dynamically correct a controlled target in response to the output from each of the ground-contact sensors 30R and 30L and posture sensor 31. More particularly, the main control 11 can implement a whole-body motion pattern in which the upper limbs, body and lower limbs of the robot apparatus 1 move in coordination by making an adaptive control on each of the sub controls 20, 21, 22R and 22L, and 23R and 23L.

For a whole-body motion of the robot apparatus 1, a foot motion, a zero-moment point (ZMP) trajectory, body motion, waist height, etc. are set and commands for actions corresponding to the settings are transferred to the sub controllers 20, 21, 22R and 22R, and 23R and 23L which will interpret the commands transferred from the main controller 11 and output a drive control signal to each of the actuators $A_2, A_3, \ldots$. The "ZMP (zero-moment point)" referred to herein means a point on the floor surface where the moment caused by the reactive force applied due to the walking of the robot apparatus 1 is zero, and the ZMP trajectory means a trajectory along which the ZMP moves while the robot apparatus 1 is walking, for example. It should be noted that the concept of the ZMP and application of ZMP to the criteria for walking-robot stability are referred to the document "Legged Locomotion Robots" (by Miomir Vukobratovic).

As above, each of the sub controllers 20, 21, . . . in the robot apparatus 1 interprets a command received from the main controller 11 to output a drive control signal to each of the actuators $A_2, A_3, \ldots$ to control each of the robot component units. Thus, the robot apparatus 1 is allowed to stably walk with its posture positively changed to a target one.

Also, the control unit 10 in the robot apparatus 1 collectively processes sensor data from the sensors such as the acceleration sensor, touch sensor, ground-contact check sensor, image information from the CCD camera and sound information from the microphone in addition to the aforementioned control of the robot posture. The control unit 10 is connected to the main controller 11 via hubs corresponding to the sensors including the acceleration sensor, giro sensor, touch sensor, distance sensor, microphone, speaker, etc., actuators, CCD camera and battery, respectively (not shown).

The main controller 11 sequentially acquires sensor data supplied from the sensors, image data and sound data and stores the data into place in the DRAM via the internal interfaces, respectively. Also, the main controller 11 sequentially acquires battery residual-potential data supplied from the battery, and stores the data into place in the DRAM. The sensor data, image data, sound data and battery residual-potential data thus stored in the DRAM are used by the main controller 11 in controlling the motions of the robot apparatus 1.

When the robot apparatus 1 is initially powered, the main controller 11 reads a control program and stores it into the DRAM. Also, the main controller 11 judges the robot's own condition and surroundings and existence of user's instruction or action on the basis of the sensor data, image data, sound data and battery residual-potential data sequentially stored in the DRAM.

Further, the main controller 11 decides a behavior on the basis of the robot's own condition under the control of the result of judgment and the control program stored in the DRAM, and drives the necessary actuators on the basis of the result of decision to cause the robot apparatus 1 to make a so-called "motion" or "gesture".

Thus the robot apparatus 1 can judge its own condition and surroundings on the basis of the control program and autonomously behave in response to a user's instruction or action.

Note that the robot apparatus 1 can autonomously behave correspondingly to its internal condition. This will be explained below using an example software configuration of the control program in the robot apparatus 1 with reference to FIGS. 27 to 32. It should be noted that the control program is prestored in the ROM 12 and read when the robot apparatus 1 is initially powered, as mentioned above.

Figure 27:
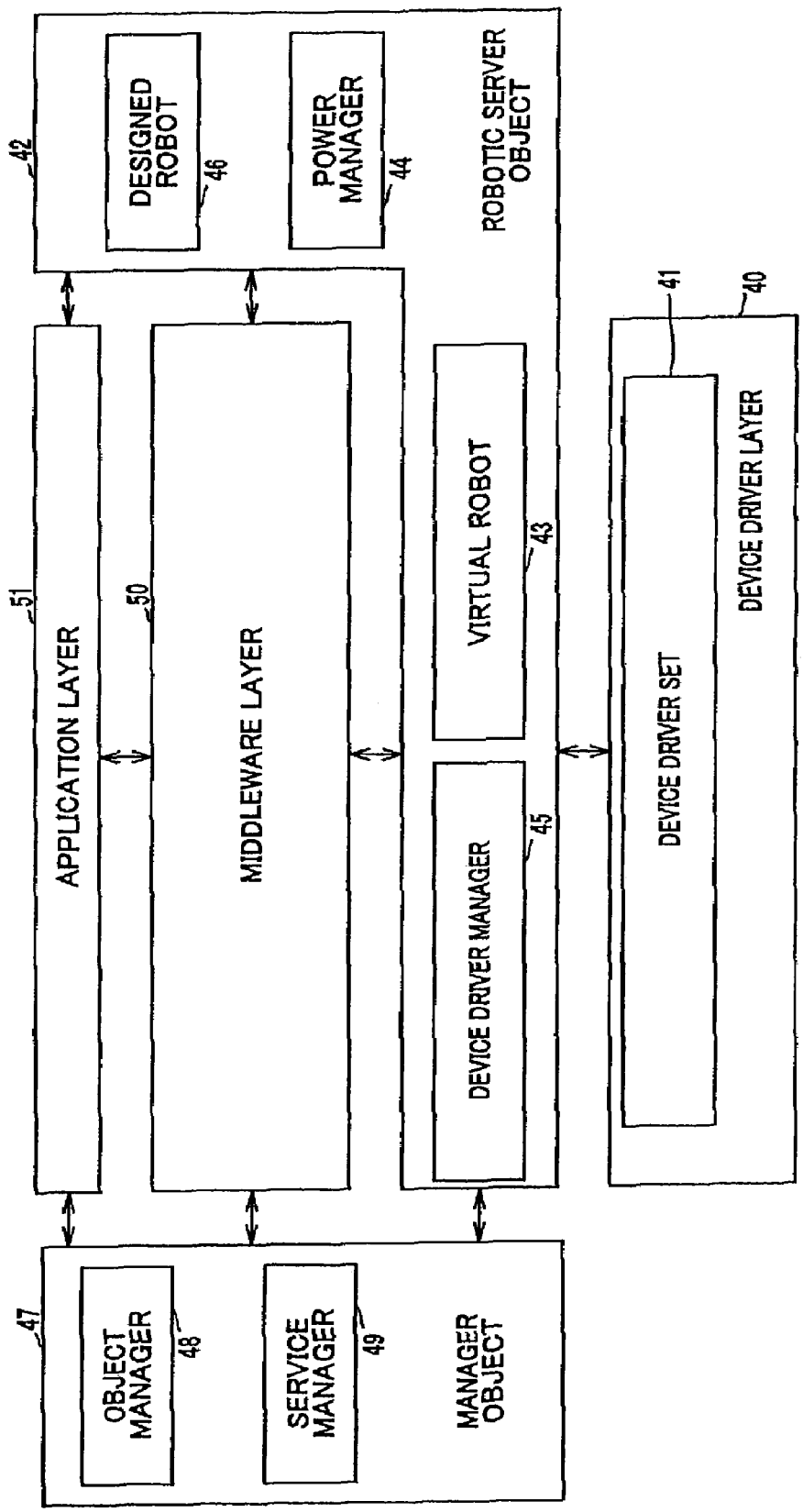
FIG. 27 is a block diagram showing an example software configuration of control program used in the robot apparatus in FIG. 24.

As shown in FIG. 27, a device driver layer 40 is provided in the lowest layer of the control program, and it includes a device driver set 41 formed from a plurality of device drivers. In this case, each of the device drivers is an object allowed to access directly the hardware used in an ordinary computer, such as a CCD camera, timer, etc. It services an interrupt from a corresponding hardware.

Also, a robotic server object 42 is provided in the lowest layer of the device driver layer 40. It includes a virtual robot 43 formed from a software group which provides an interface for access to the hardware such as the aforementioned sensors and actuators $28_1$ to $28_n$, a power manager 44 formed from a software group which manages the power switching etc., a device driver manager 45 formed from a software group which manages other various device drivers, and a designed robot 46 formed from a software group which manages the mechanism of the robot apparatus 1.

There is also provided a manager object 47 composed of an object manager 48 and service manager 49. The object manager 48 is a software group to manage the start-up and exit of each software group included in a robotic server object 42, middleware layer 50 and an application layer 51. The service manager 49 is a software group which manages the connection of each object on the basis of inter-object connection information stated in a connection file stored in the memory card.

The middleware layer 50 is provided in a layer above the robotic server object 42. It is a software group which provides basic functions of the robot apparatus 1, such as image processing, sound processing, etc. Also, the application layer 51 is provided in a layer above the middleware layer 50, and it is a software group which decides a behavior of the robot apparatus 1 on the basis of a result of processing by each software group included in the middleware layer 50.

Note that the software configurations of the middleware layer 50 and application layer 51 will be explained with reference to FIGS. 28 and 29, respectively.

Figure 28:
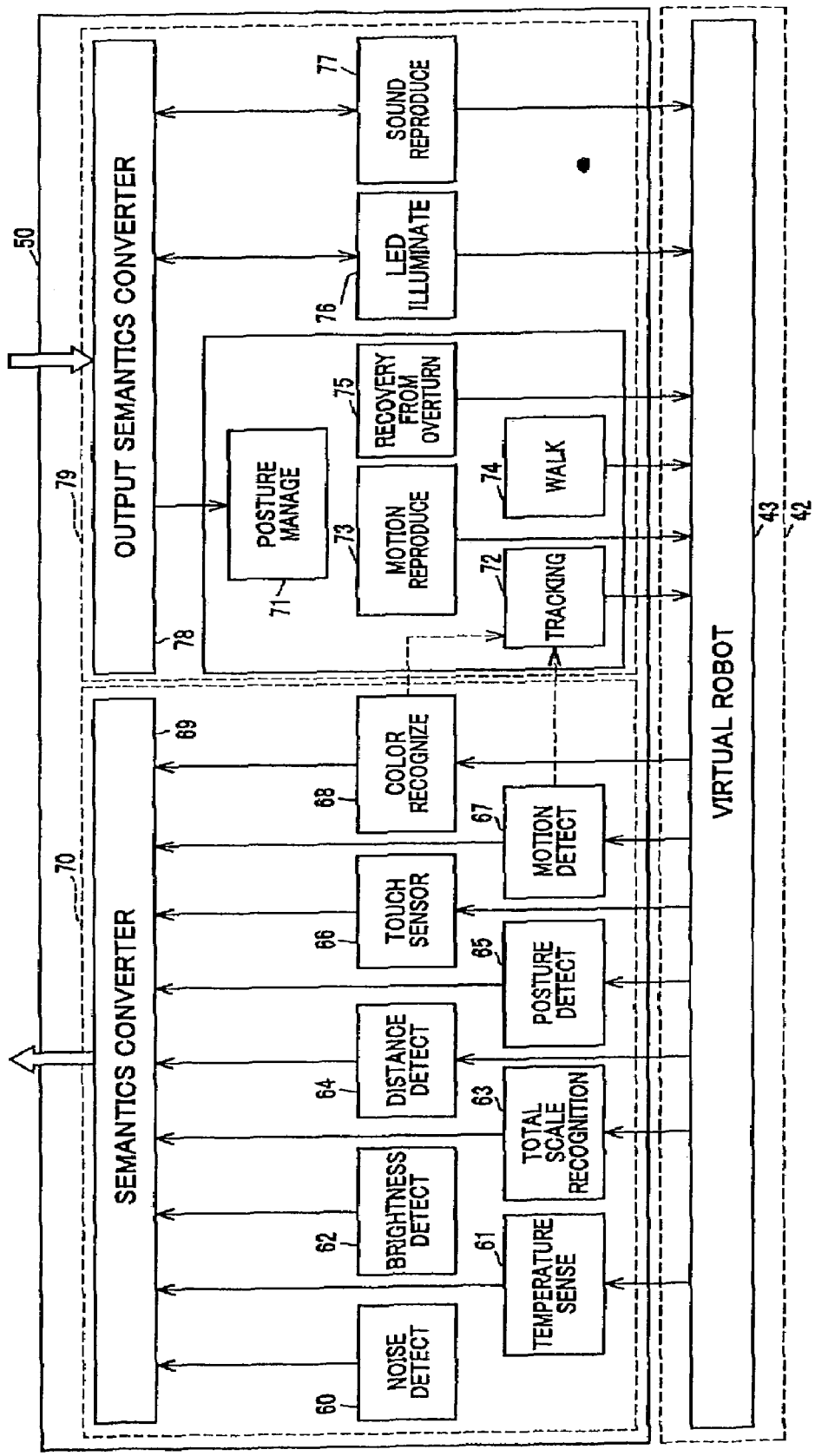
FIG. 28 is a block diagram showing the configuration of a middleware layer in the software configuration of the robot apparatus in FIG. 24.

As shown in FIG. 28, the middleware layer 50 is composed of a recognition system 70 including signal processing modules 60 to 68 for noise detection, temperature detection, brightness detection, total scale recognition, distance detection, posture detection, touch sensor, motion detection and color recognition, respectively, and an input semantics converter module 69, and an output system 79 including an output semantics converter module 78 and signal processing modules 71 to 77 for posture management, tracking, motion reproduction, walking, recovery from overturn, LED illumination and sound reproduction, respectively.

The signal processing modules 60 to 68 of the recognition system 70 acquire corresponding data of sensor data, image data and sound data read from the DRAM by the virtual robot 43 of the robotic server object 42, make a predetermined processing on the basis of the data and supply the results of processing to the input semantics converter module 69. It should be noted that the virtual robot 43 is designed to transfer or convert a signal according to a predetermined protocol, for example.

The input semantics converter module 69 uses the results of processing supplied from the signal processing modules 670 to 68 to recognize a robot's internal condition and surroundings such as "noisy", "hot", "bright", "robot has detected a ball", "robot has detected overturn", "robot has been patted", "robot has been hit", "robot has heard musical scale", "robot has detected moving object" or "robot has detected obstacle", or a user's instruction or action and supplies the result of recognition to the application layer 41.

Figure 29:
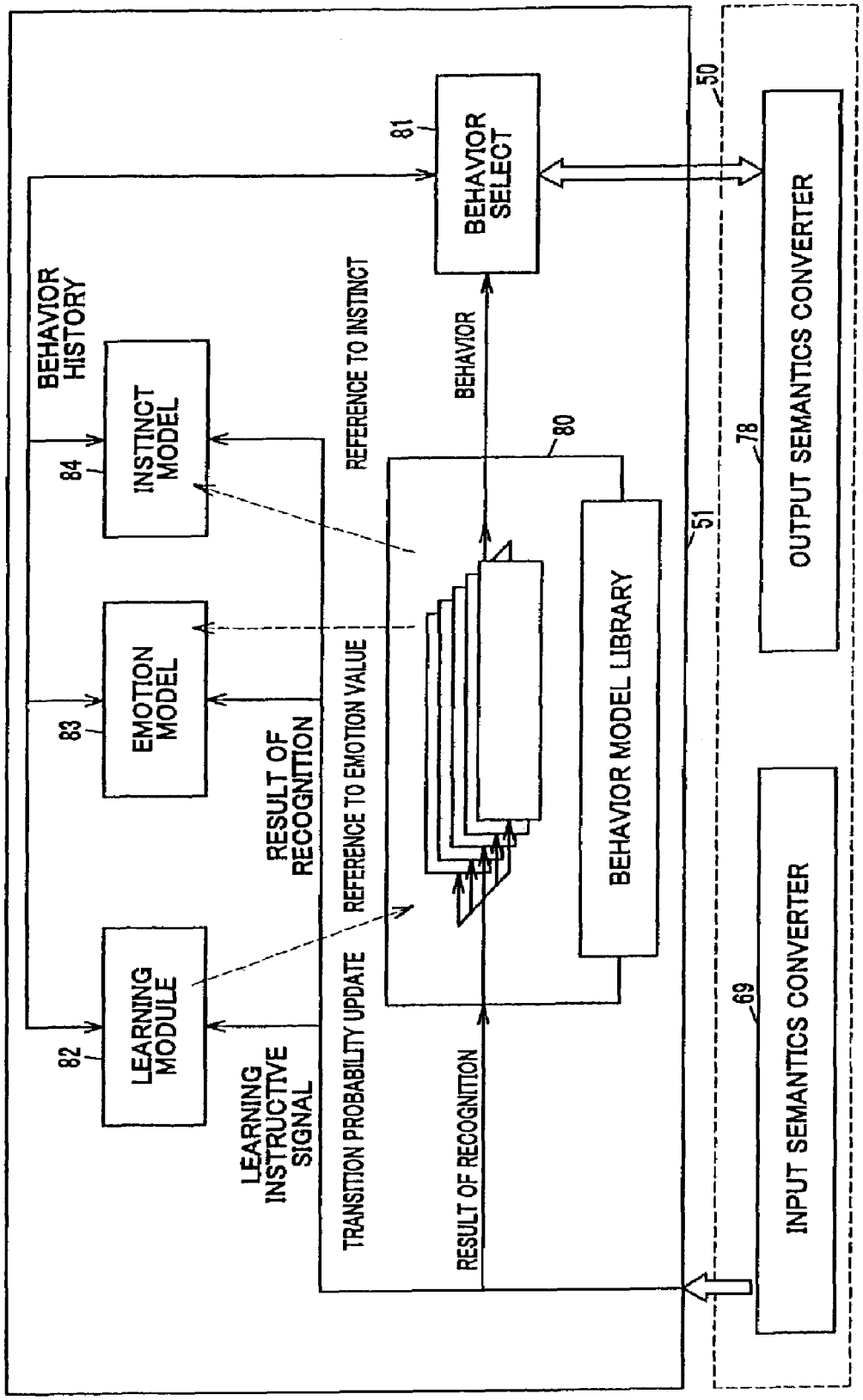
FIG. 29 is a block diagram showing the configuration of an application layer in the software configuration of the robot apparatus in FIG. 24.

As shown in FIG. 29, the application layer 51 is composed of five modules including a behavior model library 80, behavior selection module 81, learning module 82, emotion model 83 and instinct model 84.

Figure 30:
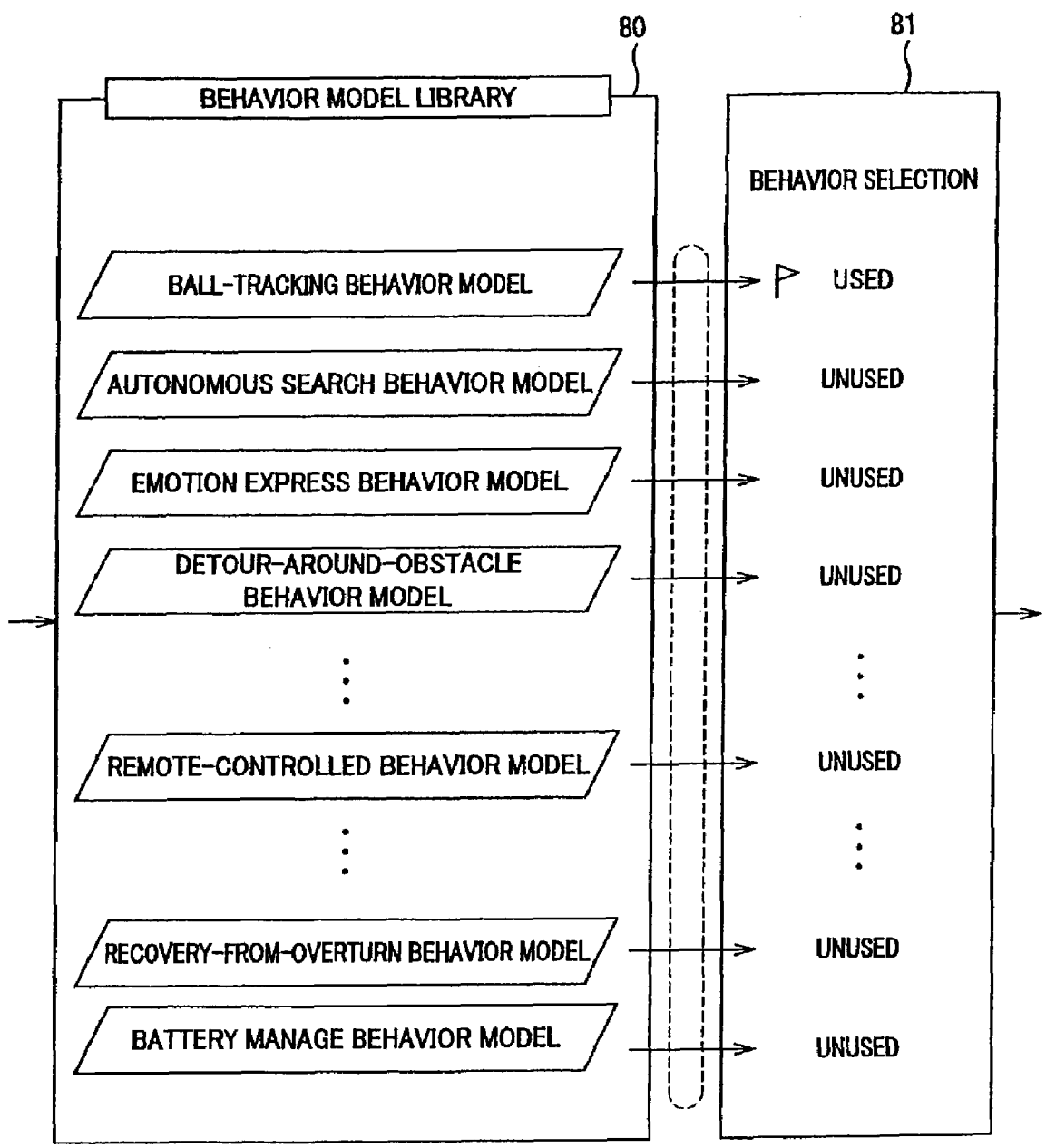
FIG. 30 is a block diagram showing the configuration of a behavior model library in the application layer in FIG. 29.

As shown in FIG. 30, the behavior model library 80 includes independent behavior models corresponding to some preselected conditional items such as "battery potential has run short", "robot recovers from being overturned", "robot detours around obstacle", "robot expresses emotion", "robot has detected ball" and the like.

When supplied with a result of recognition from the input semantics converter module 69 or upon elapse of a predetermined time after reception of a last result of recognition, each of the behavior models decides a next behavior in referring to a corresponding emotion parameter held in the emotion model 83 or a corresponding desire parameter held in the instinct model 84 whenever necessary as will be described later, and supplies the behavior data to the behavior selection module 81.

Figure 31:
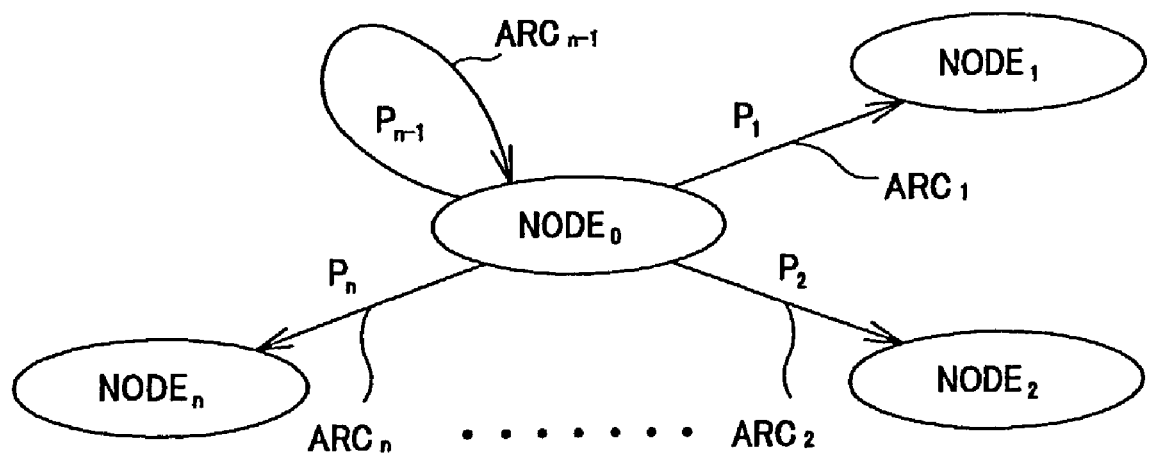
FIG. 31 explains a finite probability automaton that is information used for decision of a behavior of the robot apparatus in FIG. 24.

Note that in this embodiment, each of the behavior models uses an algorithm called "finite-probabilistic automaton" as a method of deciding a next behavior. This automaton probabilistically decides a destined one of nodes $NODE_0$ to $NODE_n$ as shown in FIG. 31 to which one, in consideration, of the remaining nodes transits to, on the basis of transition probabilities $P_1$ to $P_n$ set for arcs $ARC_1$ to $ARC_{n1}$ providing a connection between one of the nodes $NODE_0$ to $NODE_n$ and the other of them.

More specifically, each of the behavior models holds a state transition table generally indicated with a reference 90 as shown in FIG. 32 for each of the nodes $NODE_0$ to $NODE_n$.

In the state transition table 90, input events taken as transition conditions at the nodes $NODE_0$ to $NODE_n$ are listed in corresponding lines of an "Input event name" column in the order of precedence, and further conditions to the transition conditions are listed in corresponding lines of "Data name" and "Data range".

Therefore, when a result of recognition that "a ball has been detected (BALL)" is supplied, a node 100 in the state transition table 90 in FIG. 32 can transit to another node if the size of the ball (SIZE) given along with the result of recognition is within a range of 0 to 1000. When a result of recognition "an obstacle has been detected (OBSTACLE)" is supplied, the node 100 can transit to another node if the distance to the obstacle (DISTANCE) given along with the result of recognition is within a range of 0 to 100.

Even when no result of recognition is supplied, the node NODE100 can transit to another node if any of "joy", "surprise" or "sadness" held in the emotion model 83, of the emotion and desire parameters held in the emotion and instinct models 83 and 84, respectively, to which the behavior model refers periodically, is within a range of 50 to 100.

Also, in the state transition table 90, the names of nodes to which one of the nodes $NODE_0$ to $NODE_n$ can transit are listed in "Transit to" lines of a "Probability of transition to other node" column, the probability of transition to each of the other nodes $NODE_0$ to $NODE_n$ to which the nodes can transit when all the conditions stated in lines of each of "Input event name", "Data name" and "Data range" "columns" are met is stated in a corresponding line of the "Probability of transition to other node" column, and a behavior to be outputted when the node transits to any of the nodes $NODE_0$ to $NODE_n$ is stated in an "Output behavior" line of the "Probability of transition to other node" column.

It should be noted that the sum of the probabilities stated in the corresponding lines of the "Probability of transition to other node" is 100 (%).

Therefore, the node NODE100 defined as in the state transition table 90 in FIG. 32 can transit to "NODE 120 (node 120)" with a probability of 30 (%) when it is recognized that "robot has detected ball (BALL)" and "size of ball (SIZE)" is within a range of "0 to 1000", and a behavior "ACTION 1" will be outputted.

Each of the behavior models is formed from a connection of the nodes $NODE_0$ to $NODE_n$ each defined as in the aforementioned state transition table 90. For example, when it is supplied with a result of recognition from the input semantics converter module 69, it will probabilistically decide a next behavior using corresponding state transition tables of the nodes $NODE_0$ to $NODE_n$, and supplies the result of decision to the behavior selection module 81.

The behavior selection module 81 shown in FIG. 30 selects a behavior output from a one, given a predetermined highest order of precedence, of the behavior outputs from the behavior models in the behavior model library 80, and sends a command for performing the behavior (will be referred to as "action command" hereunder) to the output semantics converter module 78 in the middleware layer 50. It should be noted that in this embodiment, the behavior model in the lowest line in FIG. 30 is given the highest order of precedence while behavior model in the highest line is given the lowest order of precedence.

Also, the behavior selection module 81 informs the learning module 82, emotion model 83 and instinct model 84, on the basis of behavior completion information supplied from the output semantics converter module 78 after completion of the behavior, that the behavior is complete.

On the other hand, the learning module 82 is supplied with a result of recognition of a teaching given as a user s action such as "hit" or "pat", of the results of recognition supplied from the input semantics converter module 69.

Then, based on the result of recognition and information from the behavior selection module 71, the learning module 82 will change the transition probability of a corresponding behavior model in the behavior model library 70 by lowering the probability of expression of a behavior in response to "hitting (scolding)" while raising the probability of expression of a behavior in response to "patting (praising)".

On the other hand, the emotion model 83 holds a parameter indicating the intensity of each of a total of six emotions "joy", "sadness", "anger", "surprise", "disgust" and "fear". The emotion model 83 periodically updates each of the emotion parameters on the basis of a specific result of recognition such as "hit" and "pat" supplied from the input semantics converter module 69, time elapse, information from the behavior selection module 81, etc.

More particularly, on the assumption that a variation of the emotion calculated using a predetermined formula and based on a result of recognition supplied from the input semantics converter module 69 is $\Delta E[t]$, a concurrent behavior of the robot apparatus 1 and an elapsed time from the preceding updating, parameter of the present emotion is $E[t]$ and a coefficient of the sensitivity to the emotion is ke, the emotion model 83 calculates a parameter of the emotion $E[t+1]$ in a next period using the following equation (11), and updates the emotion parameter by replacing it with the present emotion parameter $E[t]$. Also, the emotion model 83 will update all the emotion parameters in the same way.

$$E=[t+1]=E[t]+ke \times \Delta E[t] \tag{11}$$

Note that it is predetermined how much each result of recognition and information from the output semantics converter module 78 influence the variation $\Delta E[t]$ of each emotion parameter. For example, a result of recognition "robot has been hit" will greatly influence the variation $\Delta E[t]$ of the parameter of an emotion "anger", while a result of recognition "robot has been patted" will also have a great influence on the $\Delta E[t]$ of the parameter of an emotion "joy".

The information from the output semantics converter module 78 is so-called feedback information on a behavior (information on completion of a behavior), namely, information on a result of behavior expression. The emotion model 83 changes the emotion by such information as well, which will be explainable by the fact that a behavior like "cry" will lower the level of an emotion "anger", for example. It should be noted that information from the output semantics converter module 78 is also supplied to the aforementioned learning module 82 which will take the information as a base to change the transition probability corresponding to the behavior model.

Note that the feedback of the result of a behavior may be done by an output from the behavior selection module 81 (a behavior to which an emotion is added).

On the other hand, the instinct model 84 holds parameters indicating the intensity of each of four desires "exercise", "affection", "appetite" and "curiosity". The instinct model 84 periodically updates the desire parameter on the basis of a result of recognition supplied from the input semantics converter module 69, elapsed time and information from the behavior selection module 81.

More particularly, on the assumption that a variation of each of the desires "exercise", "affection", "appetite" and "curiosity", calculated using a predetermined formula and based on a result of recognition, elapsed time and information from the output semantics converter module 78, is $\Delta I[k]$, a present parameter of the desire is $I[k]$ and a coefficient of the sensitivity to the desire is ki, the instinct model 84 calculates a parameter of the emotion $I[k+1]$ in a next period using the following equation (12), and updates the desire parameter by replacing it with the present desire parameter $I[k]$. Also, the instinct model 84 will update all the desire parameters except for the "appetite" parameter in the same way.

$$I[k+1]=I[k]+ki \times \Delta I[k] \tag{12}$$

Note that it is predetermined how much each result of recognition and information from the output semantics converter module 78 influence the variation $\Delta I[k]$ of each desire parameter. For example, information from the output semantics converter module 78 will have a great influence on the $\Delta I[k]$ of the parameter of a "fatigue".

Note that in this embodiment, the parameter of each of the emotions and desires (instincts) is so limited as to vary within a range of 0 to 100 and also the coefficients ke and ki are set separately for each of the emotions and instincts.

On the other hand, the output semantics converter module 78 of the middleware layer 50 supplies an abstract action command such as "move forward", "joy", "cry" or "track (ball)" supplied from the behavior selection module 81 of the application layer 51 as above to a corresponding one of the signal processing modules 71 to 77 of the output system 79 as shown in FIG. 28.

Each of the signal processing modules 71 to 77 generates, based on the action command thus supplied, a servo command for supply to a corresponding one of the actuators to behave as commanded, sound data to be outputted from the speaker, and drive data for supply to the LED and sends the data to the corresponding actuator, speaker or LED via the virtual robot 43 of the robotic server object 42 and the signal processing circuit in this order.

Thus, the robot apparatus 1 can autonomously behave correspondingly to its own condition (internal) and surroundings (external) and user's instruction and action under the aforementioned control program.

The control program is provided via a recording medium in which it is recorded in a form readable by the robot apparatus. As the recording media for recording the control program, there are available magnetic-reading type ones (e.g., magnetic tape, flexible disc and magnetic card), optical-reading type ones (e.g., CD-ROM, MO, CD-R and DVD), etc. The recording media include also semiconductor memory such as so-called memory card, rectangular or square), IC card, etc. Also, the control program may be provided via the so-called Internet or the like.

The control program provided in any of the above forms is reproduced by a dedicated read driver or personal computer and transmitted to the robot apparatus 1 by cable or wirelessly. Also, the robot apparatus 1 can read the control program directly from the recording medium by a drive unit, if any provided, for a small storage medium for the semiconductor memory or IC card.

In this embodiment, the obstacle recognition apparatus can extract a stable plane since it detects a plane using many measured points. Also, it can select a correct plane by collating candidate planes obtainable from the image with floor parameters obtainable from a robot's posture. Further, according to the present invention, since the obstacle recognition apparatus substantially recognizes a floor surface, not any obstacle, it can make the recognition independently of the shape and size of an obstacle. Moreover, since an obstacle is represented by its distance from the floor surface, the obstacle recognition apparatus can detect not only an obstacle but a small step or concavity of a floor. Also, the obstacle recognition apparatus can easily judge, with the size of a robot taken in consideration, whether the robot can walk over or under a recognized obstacle. Furthermore, since an obstacle can be represented on a two-dimensional floor surface, the obstacle recognition apparatus can apply the methods used with conventional robots for planning a route and also calculate such routing speedily than the three-dimensional representation.

As having been described in the foregoing, the obstacle recognition apparatus according to the present invention can accurately extract a floor surface and recognize an obstacle since the floor surface detecting means detects the floor surface on the basis of a result of coordinate transformation by the coordinate transforming means and plane parameters detected by the plane detecting means, selects a point on the floor surface using the plane parameters of the floor surface, and recognizes the obstacle on the basis of the selected point.

Also, the obstacle recognition method according to the present invention permits to accurately extract a floor surface and recognize an obstacle since in a floor surface detecting step, the floor surface is detected on the basis of a result of coordinate transformation in the coordinate transforming step and plane parameters detected in the plane detecting step, a point on the floor surface is selected using the plane parameters of the floor surface, and the obstacle is recognized on the basis of the selected point.

Also, the obstacle recognition program is executed by the robot apparatus to accurately extract a floor surface and recognize an obstacle since in a floor surface detecting step, the floor surface is detected on the basis of a result of coordinate transformation in the coordinate transforming step and plane parameters detected in the plane detecting step, a point on the floor surface is selected using the plane parameters of the floor surface, and the obstacle is recognized on the basis of the selected point.

Also, the robot apparatus according to the present invention can accurately extract a floor surface and recognize an obstacle since the floor surface detecting means detects the floor surface on the basis of a result of coordinate transformation by the coordinate transforming means and plane parameters detected by the plane detecting means, selects a point on the floor surface using the plane parameters of the floor surface, and recognizes the obstacle on the basis of the selected point.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. An obstacle recognition apparatus comprising:
   a distance image producing means for producing a distance image on the basis of a disparity image calculated based on image data supplied from a plurality of imaging means provided in a robot apparatus and sensor data outputs from a plurality of sensing means provided in the robot apparatus and using a homogeneous transform matrix corresponding to the disparity image at locations of the plurality of imaging means;
   a plane detecting means for detecting plane parameters on the basis of the distance image produced by the distance image producing means; a coordinate transforming means for transforming a coordinate system at the locations of the plurality of imaging means into a one on the floor surface;
   a floor surface detecting means for detecting the floor surface on the basis of the plane parameters detected by the plane detecting means; and
   an obstacle recognizing means for selecting a point on the floor surface using the plane parameters supplied from the plane detecting means to recognize an obstacle on the basis of the selected point, wherein the obstacle recognizing means uses the plane parameters of the floor surface detected by the floor surface detecting means to recognize an obstacle.

2. The apparatus as set forth in claim 1, wherein the floor surface detected by the floor surface detecting means and the obstacle recognized by the obstacle recognizing means are transformed into a plane coordinate whose height is zero to make a distinction between a floor surface and obstacle in a two-dimensional position in the plane.

3. An obstacle recognition method comprising steps of:
   producing a distance image on the basis of a disparity image calculated based on image data supplied from a plurality of imaging means provided in a robot apparatus and sensor data outputs from a plurality of sensing means provided in the robot apparatus and using a homogeneous transform matrix corresponding to the disparity image at locations of the plurality of distance image producing means;
   detecting plane parameters on the basis of the distance image produced in the distance image producing step;

transforming a coordinate system at the locations of the plurality of imaging means into a one on the floor surface;

detecting the floor surface on the basis of the plane parameters detected in the plane detecting step;

selecting a point on the floor surface using the plane parameters supplied from the detecting step to recognize an obstacle on the basis of the selected point; and recognizing an obstacle based on the plane parameters of the floor surface.

4. A computer-readable medium adapted to store an obstacle recognition program, executed by a robot apparatus to recognize an obstacle, the program comprising steps of:

producing a distance image on the basis of a disparity image calculated based on image data and sensor data outputs;

using a homogeneous transform matrix corresponding to the disparity image;

detecting plane parameters on the basis of the distance image produced in the distance image producing step;

transforming a coordinate system into a one on the floor surface;

detecting the floor surface on the basis of the plane parameters detected in the plane detecting step;

selecting a point on the floor surface using the plane parameters supplied from the detecting step to recognize an obstacle on the basis of the selected point; and utilizing the plane parameters of the floor surface to recognize an obstacle.

5. A mobile robot apparatus comprising:

a head unit having a plurality of imaging means and sensing means;

at least one moving leg unit having a sensing means;

a body unit having an information processing means and sensing, and that moves on a floor surface by the use of the moving leg unit while recognizing an obstacle on the floor surface, wherein the body unit comprises:

a distance image producing means for producing a distance image on the basis of a disparity image calculated based on image data supplied from the plurality of imaging means provided in the head unit and sensor data outputs from the plurality of sensing means provided in the head, moving leg and body units, respectively, wherein a homogeneous transform matrix corresponding to the disparity image at locations of the plurality of imaging means;

a plane detecting means for a detecting plane parameters on the basis of the distance image produced by the distance image producing means;

a coordinate transforming means for transforming a coordinate system at the locations of the plurality of imaging means into a one on the floor surface;

a floor surface detecting means for detecting the floor surface on the basis of the plane parameters detected by the plane detecting means; and an obstacle recognizing means for selecting a point on the floor surface using the plane parameters supplied from the plane detecting means to recognize an obstacle on the basis of the selected point, wherein the obstacle recognizing means uses the plane parameters of the floor surface detected by the floor surface detecting means to recognize an obstacle.

6. The apparatus as set forth in claim 5, wherein the floor surface detected by the floor surface detecting means and the obstacle recognized by the obstacle recognizing means are transformed into a plane coordinate whose height is zero to make a distinction between a floor surface and obstacle in a two-dimensional position in the plane.

* * * * *

UNITED STATES PATENT AND TRADEMARK OFFICE
CERTIFICATE OF CORRECTION

PATENT NO. : 7,386,163 B2  Page 1 of 1
APPLICATION NO. : 10/387647
DATED : June 10, 2008
INVENTOR(S) : Kohtaro Sabe et al.

It is certified that error appears in the above-identified patent and that said Letters Patent is hereby corrected as shown below:

On the Title page, should read

Item --(30)    Foreign Application Priority Data

March 15, 2002    (JP)    2002-073388--

Signed and Sealed this

Twelfth Day of August, 2008

JON W. DUDAS
*Director of the United States Patent and Trademark Office*